United States Patent [19]
McGrath et al.

[11] Patent Number: 6,137,771
[45] Date of Patent: Oct. 24, 2000

[54] SHUTTERLESS DATA RECORDING CARTRIDGE AND DRIVE FOR USING SAME

[75] Inventors: Michael C. McGrath, Pleasanton; James D. Fahey, Farmington; David A. Taylor, Pleasanton, all of Calif.

[73] Assignee: Iomega Corporation, Roy, Utah

[21] Appl. No.: 08/835,437

[22] Filed: Apr. 9, 1997

[51] Int. Cl.[7] .................................................. G11B 23/03
[52] U.S. Cl. ........................................ 369/291; 360/133
[58] Field of Search ................................. 369/291, 289, 369/77.2; 360/133

[56] References Cited

U.S. PATENT DOCUMENTS

| | | | |
|---|---|---|---|
| Re. 33,695 | 9/1991 | Ogusu | 369/291 |
| D. 314,567 | 2/1991 | Ichitsubo | D14/114 |
| 3,800,325 | 3/1974 | O'Brien | 360/98 |
| 3,899,794 | 8/1975 | Brown, Jr. | 360/133 |
| 3,975,768 | 8/1976 | Jacques et al. | 360/99 |
| 4,084,200 | 4/1978 | Adair et al. | 360/133 |
| 4,445,157 | 4/1984 | Takahashi | 360/133 |
| 4,627,037 | 12/1986 | Tamaru et al. | 369/291 |
| 4,683,506 | 7/1987 | Toldi et al. | 360/105 |
| 4,717,981 | 1/1988 | Nigam et al. | 360/133 |
| 4,722,012 | 1/1988 | Toldi et al. | 360/97 |
| 4,748,530 | 5/1988 | Barnes | 360/133 |
| 4,750,063 | 6/1988 | Kume et al. | 360/99 |
| 4,771,883 | 9/1988 | Herr et al. | 206/313 |
| 4,793,480 | 12/1988 | Gelardi et al. | 369/291 |
| 4,805,770 | 2/1989 | Grobecker et al. | 369/291 |
| 4,870,518 | 9/1989 | Thompson et al. | 360/97.01 |
| 4,949,205 | 8/1990 | Tezuka | 360/99.05 |
| 4,965,685 | 10/1990 | Thompson et al. | 360/97.01 |
| 5,034,824 | 7/1991 | Morisawa et al. | 358/335 |
| 5,138,591 | 8/1992 | Ogawa et al. | 369/36 |
| 5,175,657 | 12/1992 | Iftikar et al. | 360/98.01 |
| 5,175,726 | 12/1992 | Imokawa | 369/291 |
| 5,204,793 | 4/1993 | Plonczak | 360/97.01 |
| 5,235,481 | 8/1993 | Kamo et al. | 360/97.01 |
| 5,253,751 | 10/1993 | Wipper | 206/45.19 |
| 5,317,464 | 5/1994 | Witt et al. | 360/99.08 |
| 5,381,402 | 1/1995 | Lee et al. | 360/133 |
| 5,398,141 | 3/1995 | Tannert | 360/133 |
| 5,417,323 | 5/1995 | Presnick | 206/309 |
| 5,445,265 | 8/1995 | Herr et al. | 206/308.1 |
| 5,475,674 | 12/1995 | Yamashita et al. | 369/291 |
| 5,535,072 | 7/1996 | Witt et al. | 360/99.06 |
| 5,570,252 | 10/1996 | Sumner et al. | 360/133 |
| 5,636,095 | 6/1997 | McGrath et al. | 360/133 |
| 5,699,210 | 12/1997 | Thompson et al. | 360/99.06 |

OTHER PUBLICATIONS

"Laserfile® The Ultimate in Disc Packaging" and "Laserfile® The Ultimate in CD Packaging" information packet, Laserfile, Inc., 1996, 10 pages.

*Primary Examiner*—Brian E. Miller
*Assistant Examiner*—Tod Kupstas
*Attorney, Agent, or Firm*—Woodcock Washburn Kurtz Mackiewicz & Norris LLP

[57] ABSTRACT

A data recording cartridge that includes a shell that protects a data recording medium from damage and from particulate contamination is disclosed. When the cartridge is in a closed position, the top shell and bottom shell form a seal to exclude particulate matter from the data recording medium. Because the seal encloses the perimeter of the data recording medium, both internally generated and external particulates do not contaminate the data recording medium. A drive for opening and operating the cartridge is also disclosed.

Another aspect of the present invention includes a hub having an enlarged center hollow, and a spindle motor having a top protrusion that fits into the enlarged center hollow. A spindle motor top bearing juts into the underside of a cavity created by the protrusion, thereby more efficiently using vertical space.

34 Claims, 32 Drawing Sheets

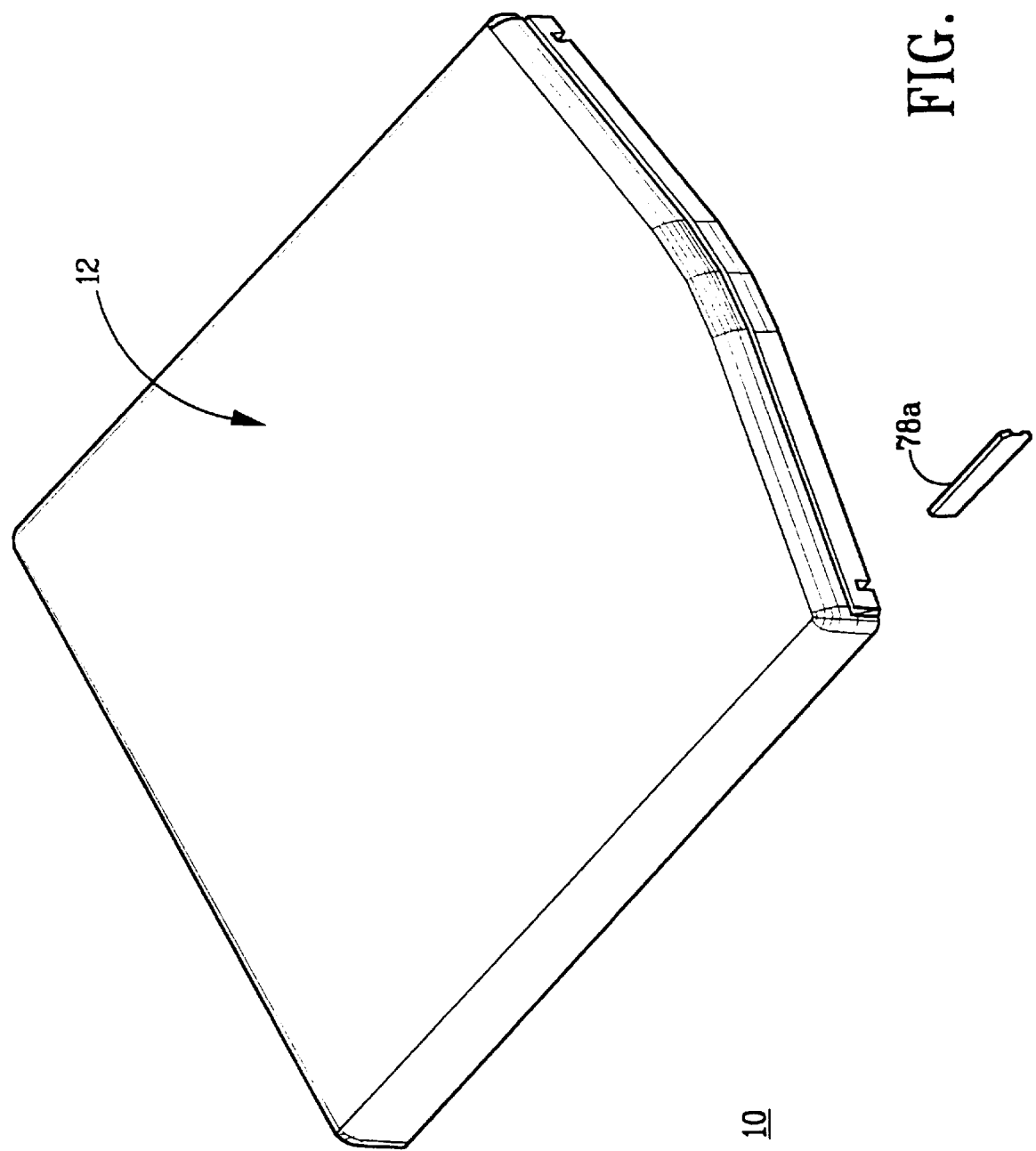

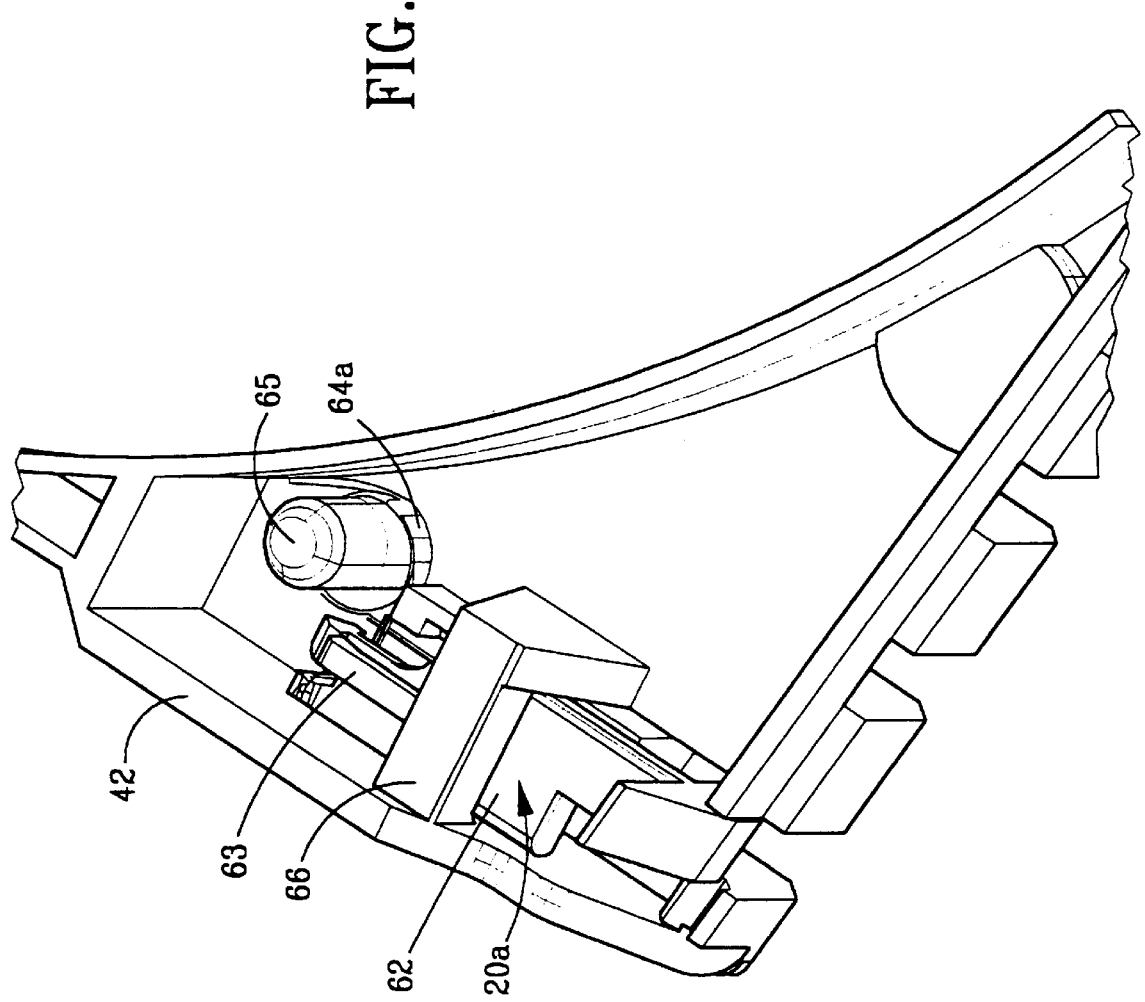

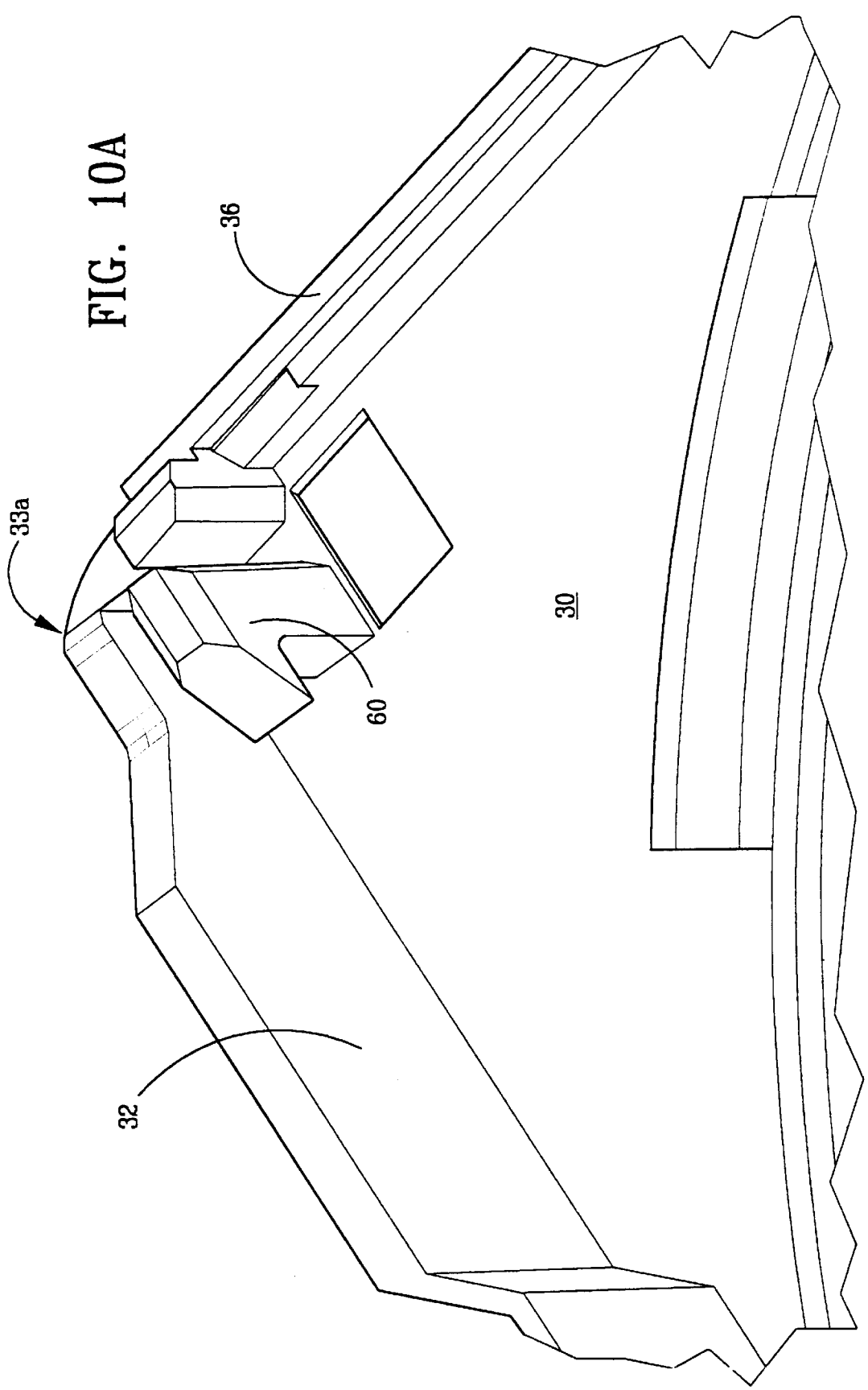

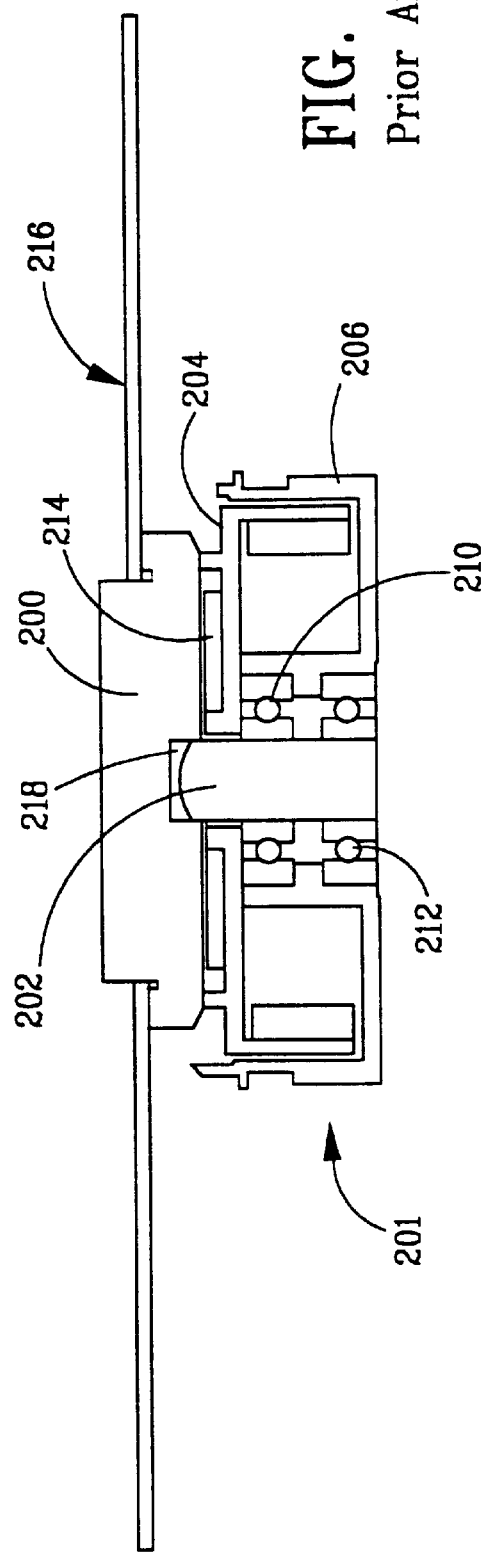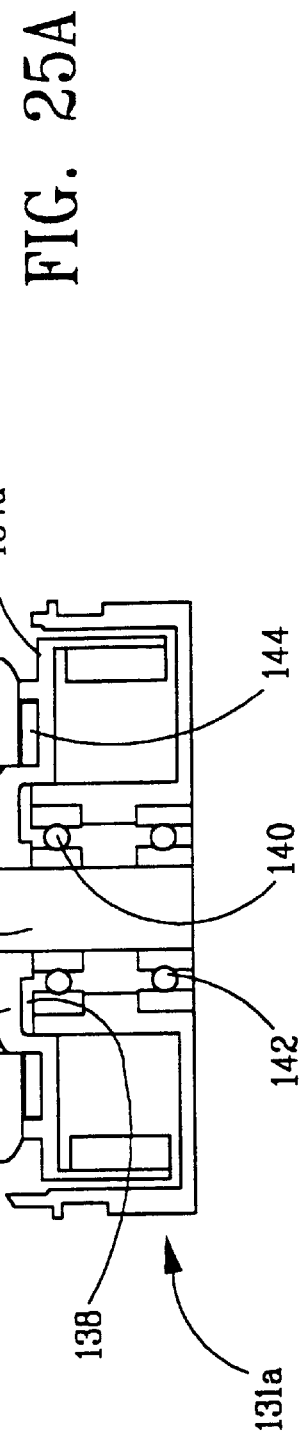

SHUTTERLESS DATA RECORDING CARTRIDGE AND DRIVE FOR USING SAME

BACKGROUND OF THE INVENTION

This invention relates to data recording drives and, more particularly, to a removable cartridge and drives for data recording thereon.

Removable magnetic disk cartridges generally employ a protective shell that surrounds and protects a data recording medium from dust, impact, and other data-corrupting influences. A well-known industry trend has been toward increasing data storage capacity. Greater data capacity usually is accomplished by more densely arranging tracks on the surface of the data storage medium. A competing industry trend is toward a storage medium having a smaller form factor. The smaller form factor has resulted in efforts to conserve space within the cartridge in order to maximize the surface area of the data storage medium. Furthermore, a smaller cartridge requires even higher track density to maintain or increase data storage capacity compared with a larger cartridge.

Unfortunately, the higher storage density generally makes a recording medium more sensitive to contamination by dust particles. That is, a certain quantity and size of particulate matter that may be tolerated by a similar data recording medium may cause contamination of a data storage media that have more densely concentrated tracks. Contamination may cause, for example, interruption of data reading or recording, lower accuracy of head positioning, and diminished reliability. This greater sensitivity to particulate matter requires better sealing than prior art cartridges have provided.

A cartridge that protects a recording medium and provides sealing is described in U.S. Pat. No. 5,570,252 Sumner et al., which is assigned to the assignee of the present invention. The Sumner cartridge has a rigid shell, a magnetic medium, and a flexible door that covers an opening through which drive heads pass. The flexible door slides in a curved track along the cartridge wall, thereby efficiently using space within the cartridge by eliminating any dead space through which a hinged, rigid door would sweep. Because the disk substantially fills the space inside, the Sumner cartridge efficiently uses space.

Particulate matter may originate from sources either outside of the cartridge or from moving parts within the cartridge. For example, conventional cartridges have moving parts that generate particles as surfaces abrade one another. Furthermore, conventional cartridge shells often have internal mechanisms that clamp the data recording medium to protect it from shock and vibration while the cartridge is outside the drive. The internal mechanisms are typically retractable to allow the medium to rotate while the cartridge is inside the drive. Unfortunately, the internal mechanisms are expensive to manufacture and the moving parts that form the internal mechanisms produce particulate matter. Furthermore, the internal clamping mechanisms are often more delicate than the other parts of the shell and are therefore subject to breaking. For example, U.S. Pat. No. 5,235,481 (Kamo) describes a removable cartridge that has a protective shell around a data recording medium and provisions to seal dust from the medium. Unfortunately, the Kamo cartridge has numerous internal parts that make the cartridge more susceptible to damage if jolted. An additional drawback of the Kamo cartridge is that the internal parts are complicated and costly to produce. Furthermore, the movement of the shutter and the internal parts generate particulate matter within the shell that can harm the function of the data recording medium.

Some conventional protective shells enclose a disk while using few internal parts. However, these protective cases typically require a user to remove a cover while the case is outside of the drive. Removing the cover typically exposes the medium to dust particle contamination in the ambient air. For example, U.S. Pat. No. 5,475,672 (Yamashita) describes a cartridge having provisions for securing a rigid disk within a two-piece shell. The top portion of the two-piece shell, which itself is a protective case, may be inserted into a corresponding disk drive. A hinged lid on the top portion allows access to the disk. However, a disk in the Yamashita cartridge is unprotected from particulate contamination in two ways: first, the disk is removable by the user, which subjects the disk to the ambient atmosphere, and, second, the case top portion has a drive opening that is uncovered when the top portion is detached from the bottom portion of the case. Furthermore, particulates generated from the hinge and other abrading parts may foul the medium because the medium is not sealed therefrom.

Some cartridges, in contrast to the Yamashita cartridge, have a non-removable data recording medium housed within a cartridge. Often, the cartridge is opened by a mechanism within the drive as the cartridge is loaded into the drive. U.S. Pat. No. 5,175,726 (Imokawa) describes such a protective cartridge for a non-removable optical disk. The Imokawa cartridge protects an optical disk by providing a non-recording surface around the perimeter of the disk. A shell provides space around the disk to permit the disk to move freely within the shell, although only the non-recording portion of the disk and the hub contact the shell. Unfortunately, the contact between the case and the non-recording portion of the disk generates particulate matter within the shell. Moreover, the Imokawa cartridge has a shutter that slides over an opening in the case, thereby generating particulate matter within the shell, which could contaminate the medium.

Regarding disk drives for operating removable cartridges, vertical height restrictions make thinner disk drives advantageous. Disk drive height for removable cartridge drives depends, in part, on overall spindle motor height, which is primarily dictated by bearing thickness, bearing spacing, and height of the engagement feature for engaging and locating the disk. Referring to FIG. 24, a conventional spindle motor 201 is shown engaged with a conventional disk hub 200 having a hole 218. Spindle motor 201 includes a spindle pin 202, a rotor 204, an upper bearing 210, a lower bearing 212, and clamp magnets 214. Rotor 204 is attached to pin 202, which is supported by bearings 210 and 212. Hole 218 typically is approximately 5 mm diameter, which is smaller than conventional spindle motor bearing 140 outside diameter.

As conventional spindle motor 201 is raised toward conventional hub 200, spindle motor pin 202, which has approximately 5 mm outside diameter, engages with hole 218 of cartridge hub 200 and aligns the hub 200 with spindle motor 201. Overall spindle motor height typically includes, therefore, electric motor height (including motor bearings 210 and 212) plus height of the pin 202 protruding above motor bearings 210 and 212.

There is a need, therefore, for a data recording cartridge and disk drive that overcome the disadvantages of the prior art.

SUMMARY

According to one aspect of the present invention, a data recording cartridge is provided that protects a data recording medium from shock and vibration and from particulate contamination. The cartridge has a top shell and a bottom shell, a latch to unlock and lock the shells together, a data recording medium, a hinge, and a seal. The shells enclose the data recording medium while the cartridge is outside the drive. The bottom shell has an aperture, which is formed without a shutter, for enabling a drive motor to couple to a hub of the disk.

While outside the drive, the top shell and bottom shell form two substantially planar surfaces that are approximately parallel. The top and bottom shells, which are locked together by the latch, each form parts of the seal, which is formed when the cartridge is closed. The seal is located around the perimeter of the disk so as to prevent particulates generated by the latch and hinge from reaching the medium. The disk hub and disk surface are securely held between the top shell and the bottom shell so that the data recording areas of the medium do not substantially contact either the top or bottom shell. An air gap between the data recording areas of the medium and the shell protects the disk if the cartridge is jolted or impacted while it is outside of the drive.

According to another aspect of the present invention, a drive for operating the cartridge includes a disengaging member for unlocking the latch apparatus to receive and position the cartridge, wedges to pivot apart the top shell and bottom shell, and apparatus to close the cartridge as it is ejected.

According to yet another aspect of the present invention, a spindle motor and hub are provided that efficiently use vertical space and enhance motor performance. The hub has a center hollow that has a diameter larger than the motor bearing outside diameter. The motor is formed with a rotor having a top protrusion that fits into the hub center hollow. Because of the large center hollow diameter, at least part of a motor bearing fits into a cavity formed by the top protrusion, thereby efficiently using vertical space.

Further details and advantages of the present invention will become evident hereinafter.

DESCRIPTION OF THE DRAWINGS

FIG. 2 shows a perspective view of the data recording cartridge including an embodiment for unlocking the cartridge;

FIGS. 9A and 9B show a view of one of the latch assemblies of FIG. 6, with the cartridge in the closed position and the top shell removed;

FIGS. 10A and 10B show a view of the hook protruding from the top shell;

FIG. 24 (prior art) shows a cross-section of a conventional spindle motor and hub; and FIGS. 25A and 25B show a cross-section of a spindle motor and hub according to embodiments of yet another aspect of to the present invention.

DESCRIPTION OF A PREFERRED EMBODIMENT

According to a presently preferred embodiment, a data recording cartridge and drive will now be described with reference to the Figures. It will be appreciated that the description given herein with respect to those Figures is for exemplary purposes only and is not intended in any way to limit the scope of the invention. For example, during the description of the preferred embodiment, a rigid magnetic medium and the like are used to illustrate the invention. However, such examples are merely for the purpose of clearly describing the present invention and are not intended as limitations, as the invention is equally applicable to other media such as rigid optical disks and flexible media. In a preferred embodiment, the data recording medium is a magnetic disk that has a center hub. The invention also encompasses other data recording mediums, such as an optical disk, a plurality of stacked magnetic disks, and a plurality of stacked optical disks. In embodiments in which the disks are stacked, the disks are preferably oriented in parallel planes around a single axis.

Figure 1:
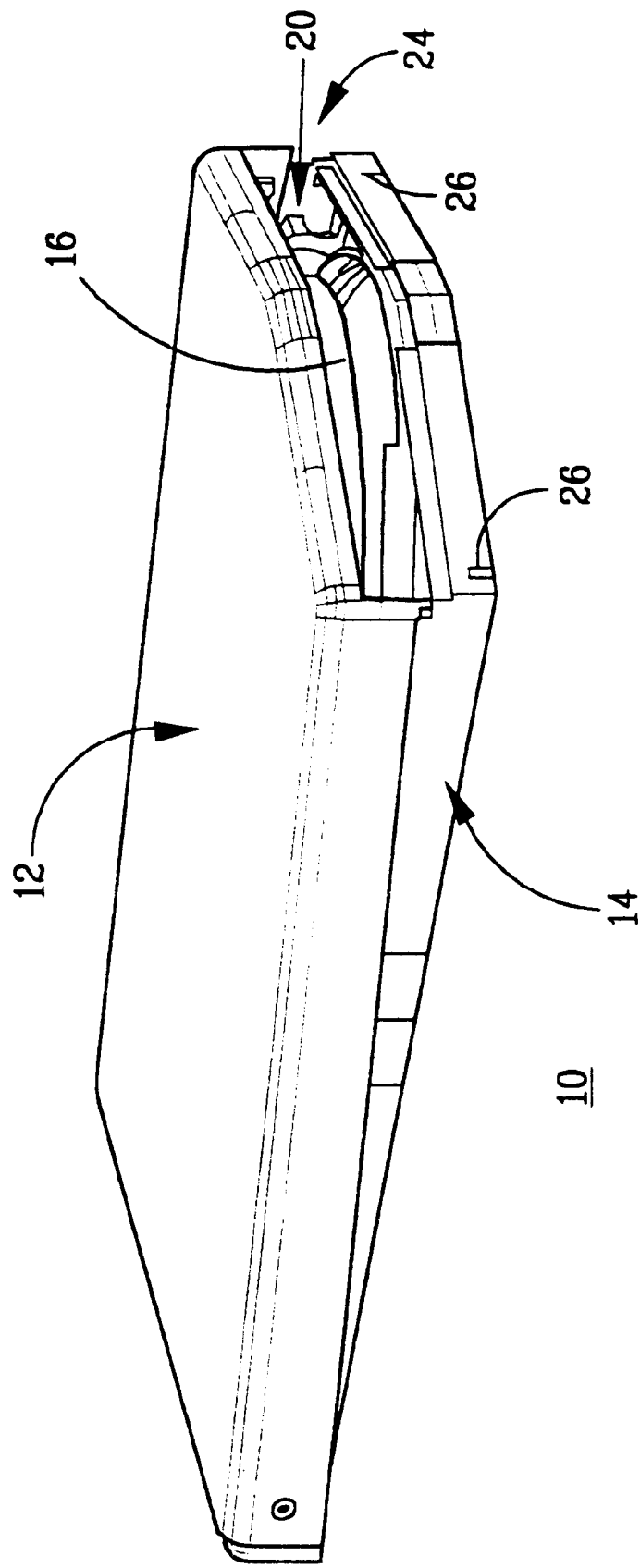
FIG. 1 shows a data recording cartridge according to one aspect of the present invention, with the shells in the open position.
Figure 14:
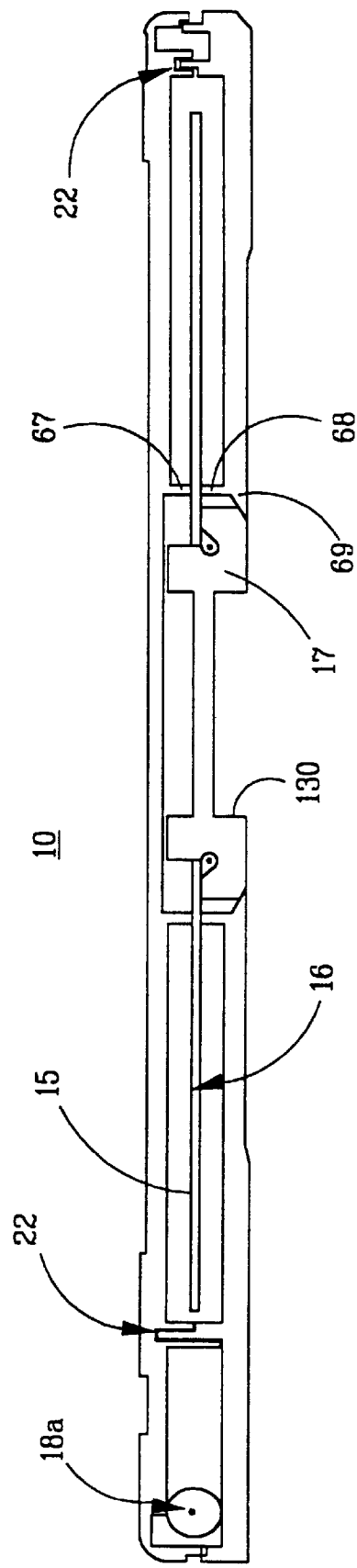
FIG. 14 shows a sectional view of cartridge.

Referring to the drawings, and referring particularly to FIG. 1, there is shown a cartridge 10 that illustrates an embodiment of one aspect of the present invention. Cartridge 10 has a top shell 12, a bottom shell 14, recording medium 16, a seal assembly 22 (not shown in FIG. 1) and two latch assemblies 20. The top shell 12 and bottom shell 14 mutually pivot about hinge assemblies 18 (not shown in FIG. 1) to an open position to form a drive head opening 24. Hinge assemblies 18a and seal assembly 22 are shown in FIG. 14. The top shell 12 and bottom shell 14 also pivot to form a closed position of the data recording cartridge 10, as shown in FIG. 2. Although FIG. 2 shows the cartridge 10 substantially to be a parallelepiped, the present invention encompasses other shapes having the features described herein.

Figure 3A:
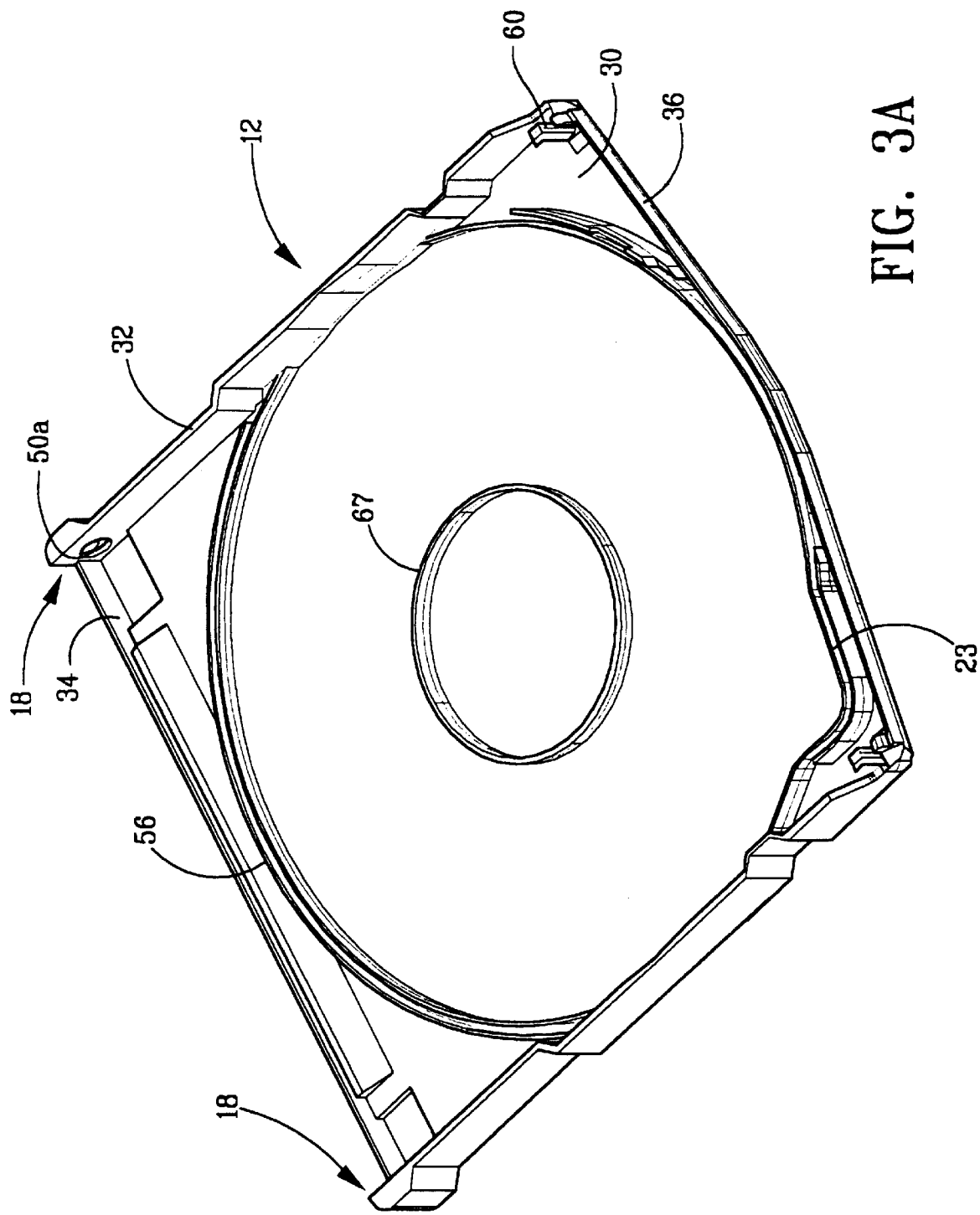
FIGS. 3A and 3B show a view of the inside of the top shell of the data recording cartridge of FIG. 1.
Figure 3B:
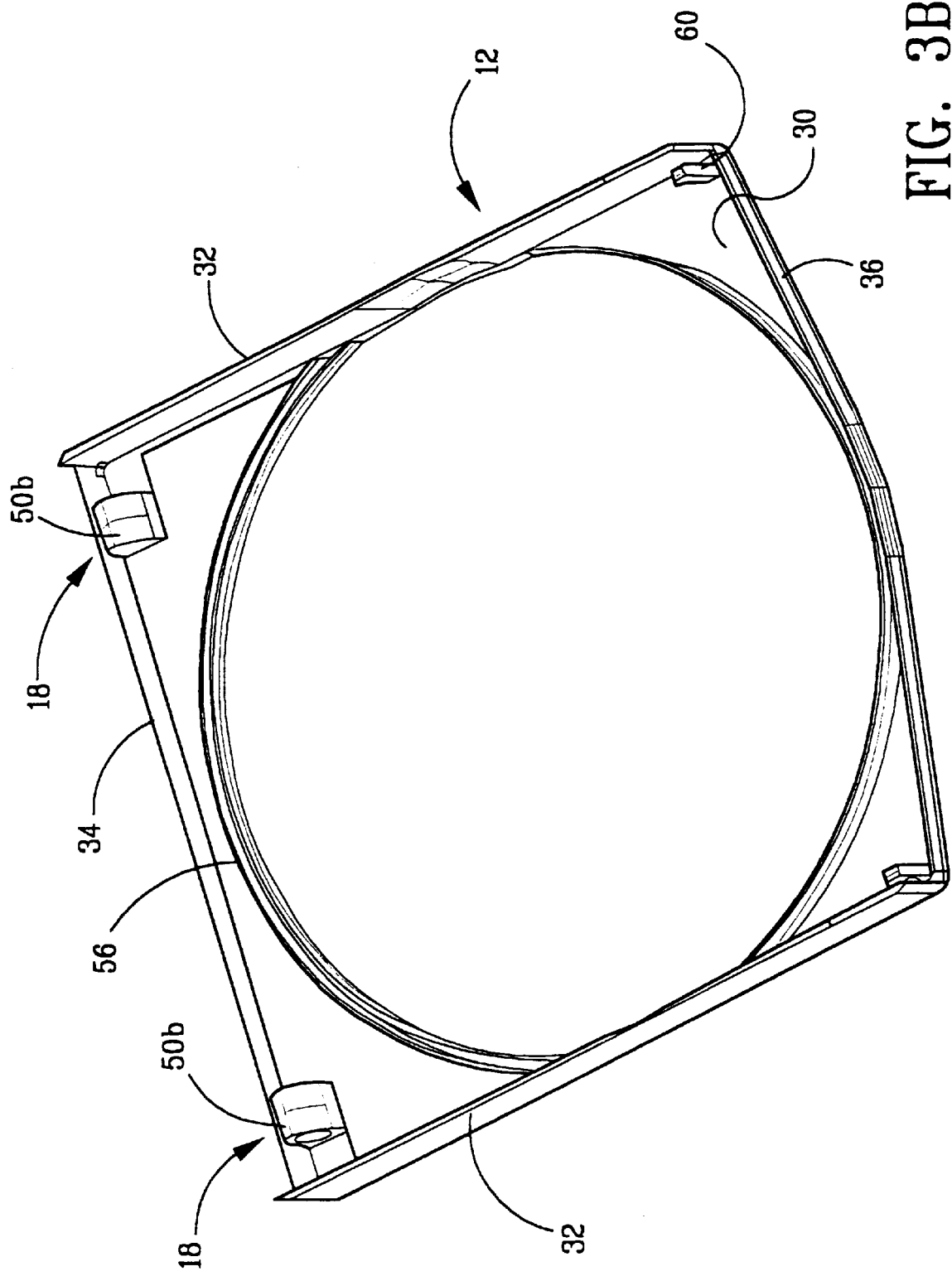
Figure 4A:
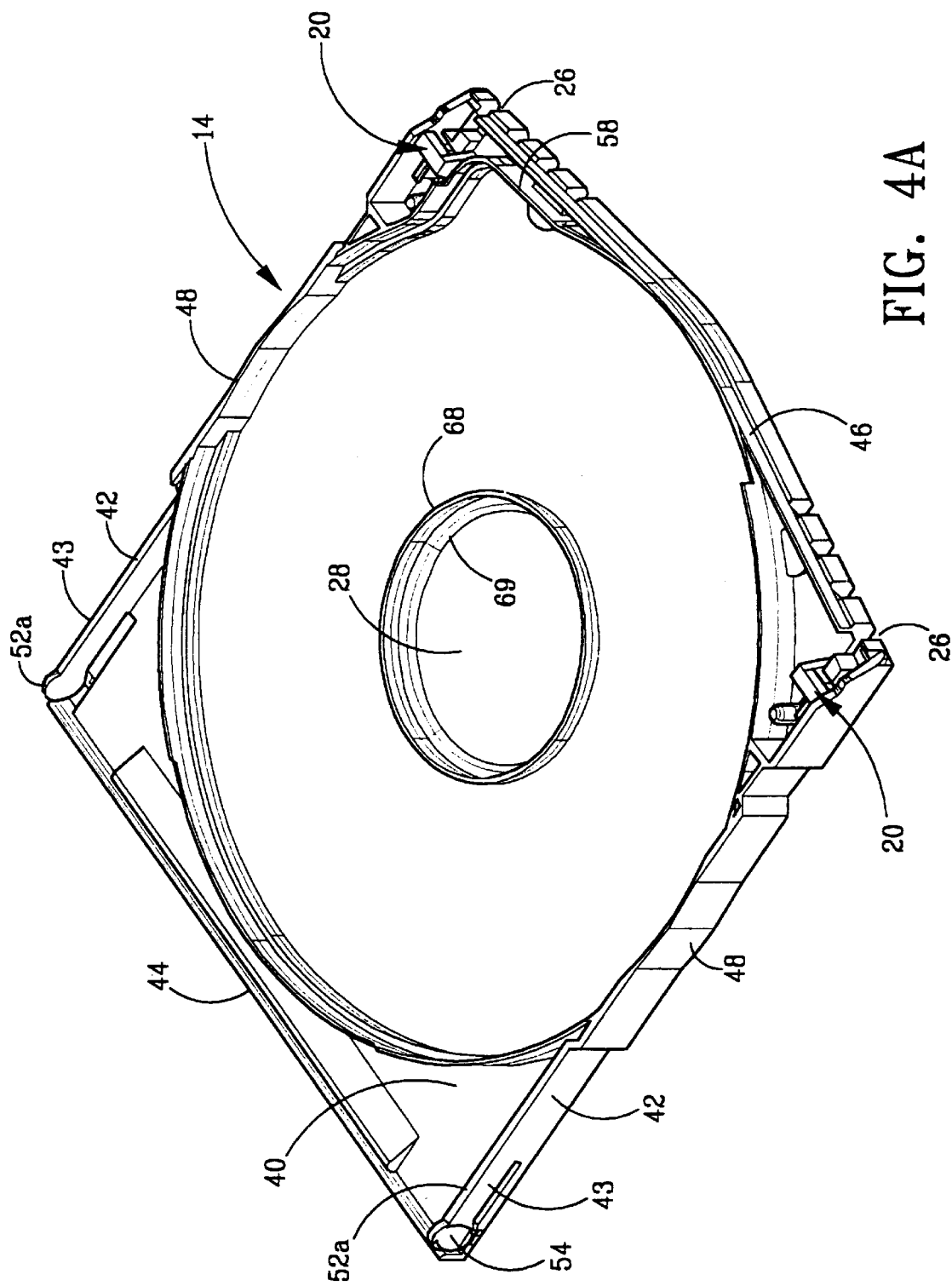
FIGS. 4A and 4B show a view of the bottom shell of the data recording cartridge of FIG. 1.
Figure 4B:
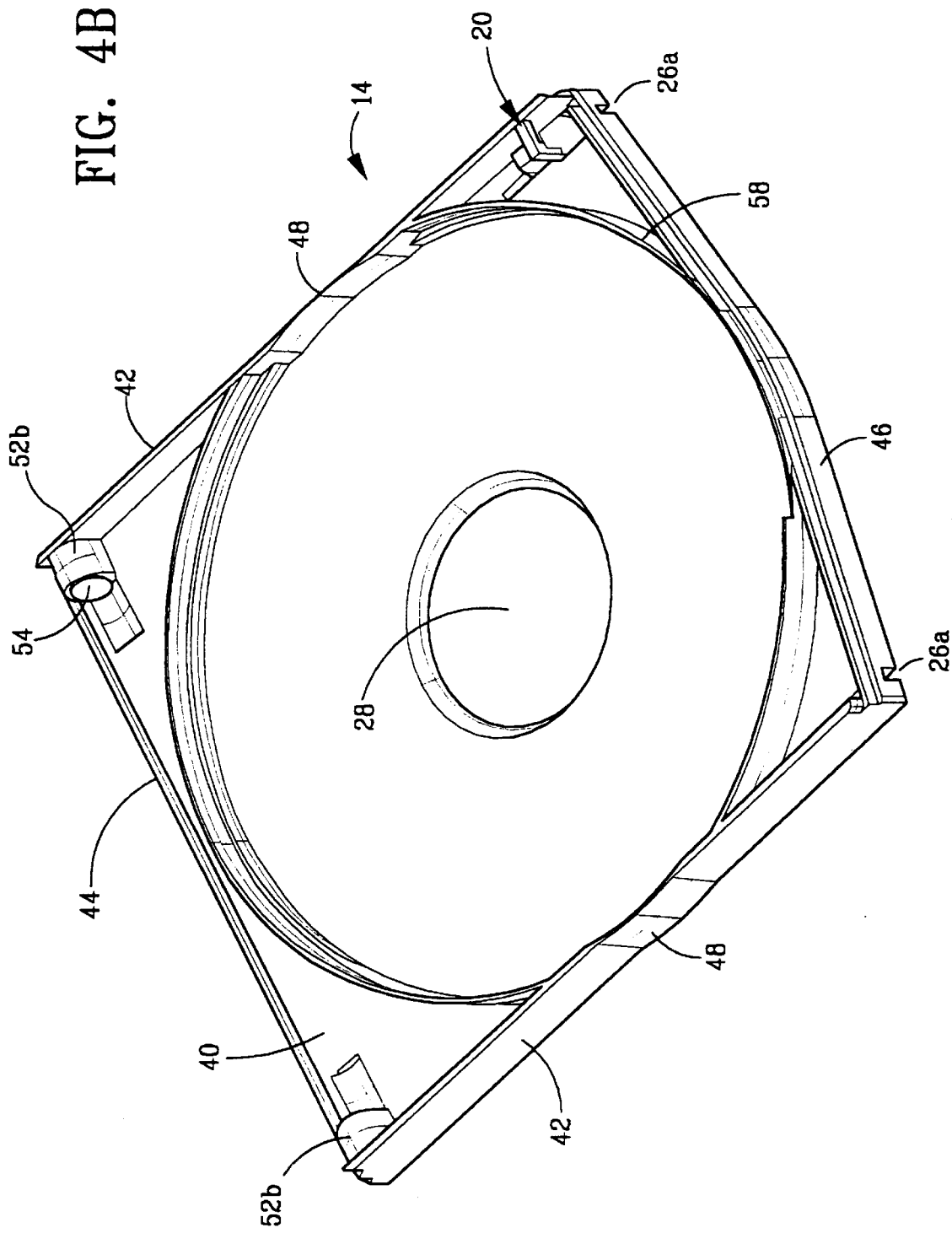

As shown in FIGS. 3A and 3B, the top shell 12 has a top plate 30, two top side walls 32, a top back wall 34, and a top front wall 36. As shown in FIGS. 4A and 4B, the bottom shell 14 has a bottom plate 40, two bottom side walls 42, a bottom back wall 44, and a bottom front wall 46. To maximize the space available for the data recording medium 16, each bottom side wall 42 has a thin-walled portion 48 approximately located where the bottom side wall 42 is tangent to the edge of the data recording medium 16. The bottom plate 40 has a circular motor aperture 28 for enabling a drive motor (not shown) to pass therethrough to engage the hub 17 of the disk 16.

Preferably, when cartridge 10 is in the closed position, bottom shell 14 has dimensions such that bottom side walls 42 and bottom back wall 44 form a rectangular shape that fits within a corresponding rectangular shape that is formed by top side walls 32 and top back wall 34. Top front wall 36 preferably meets bottom front wall 46 when cartridge 10 is in the closed position.

Referring specifically to FIGS. 3A and 4A, which illustrate a preferred embodiment for holding the recording medium 16, a top holding member 67 and a bottom holding member 68 protrude from the top plate 30 and bottom plate 40, respectively. The bottom holding member 68 has a chamfered portion 69. Preferably, the top holding member 67 and bottom holding member 68 secure a surface 15 of the recording medium 16 and the chamfered portion 69 presses against the hub 17 so as to hold the recording medium 16 while the cartridge is in the closed position, as shown in FIG. 14. Members 67 and 68 and chamfered portion 69 form a seal for inhibiting external particulate matter from communicating with surface 15 of medium 16.

Referring again to FIGS. 3A, 3B, 4A and 4B, components of hinge assemblies 18 and seal assembly 22 are shown with respective, opposing parts removed for clarity. Each hinge assembly 18 has a top leaf 50a,b, a bottom leaf 52a,b, and a pin 54. Each top leaf 50 is formed by the top plate 30. Each bottom leaf 52a,b is attached to the bottom plate 40 and, preferably, to the bottom side wall 42. Pin 54 may be formed as part of either leaf for manufacturing convenience, or pin 54 may be formed as a separate piece that is inserted into a corresponding opening in each leaf.

Referring to FIGS. 3A and 4A, a preferred embodiment of each hinge assembly 18 comprises a top leaf 50a integrally formed within the top side wall 32, a bottom leaf 52a located on a cantilever member 43, and a pin 54 coupled to bottom leaf 52a. Cantilever member 43 is preferably formed as part of bottom side wall 42 to provide assembly clearance enabling top shell 12 and bottom shell to be snapped together. Referring to FIGS. 3B and 4B, an alternate embodiment of the hinge assembly 18 is shown having a barrel-shaped top leaf 50b and bottom leaf 52b.

Although the present invention is described herein as having separate top shell 12 and bottom shell 14 that are joined with hinge 18a,b, the present invention is not limited thereto. Specifically, the present invention encompasses a top shell 12 and bottom shell 14 formed as a single continuous piece that includes a flexible portion functioning as a living hinge.

Seal assembly 22 includes at least one top seal ring 56, which is attached to top plate 30, and at least one bottom seal ring 58, which is attached to bottom plate 40, as shown also in FIG. 14. Preferably, top seal ring 56 and bottom seal ring 58 each comprise concentric rings that are closely spaced apart, but do not contact when cartridge 10 is closed. Rather seal rings 56 and 58 interleave to form a labyrinth type seal. The separation between the rings is such that the rings do not rub against each other as cartridge 10 is opened and closed. In other embodiments of the present invention, seal assembly 22 may comprise a compliant seal, including for example an elastomer or foam, in a variety of configurations, including for example, o-ring, v-ring, packing, and the like. When cartridge 10 is in a closed position, as shown in FIG. 14, seal assembly 22, together with side walls 32, encloses the perimeter of data recording medium 16 so as to isolate data recording medium 16 from particulate matter generated by operation of hinge assemblies 18 and latch assemblies 20.

Referring particularly to FIGS. 3A and 4A, seal assembly 22 has at least one non-circular portion 23 located near the front of cartridge 10. Because the non-circular portion 23 is further (compared with a perfect circle) spaced apart from hinge assembly 18, non-circular portion 23 forms a larger opening 24 through which drive heads may move easily pass. Other non-circular portions (not shown) may be formed in the seal assembly 22 near the back of the cartridge 10 proximate the hinge assemblies 18 for enabling location of a filter assembly (not shown) for filtering particulates from air.

Figure 5:
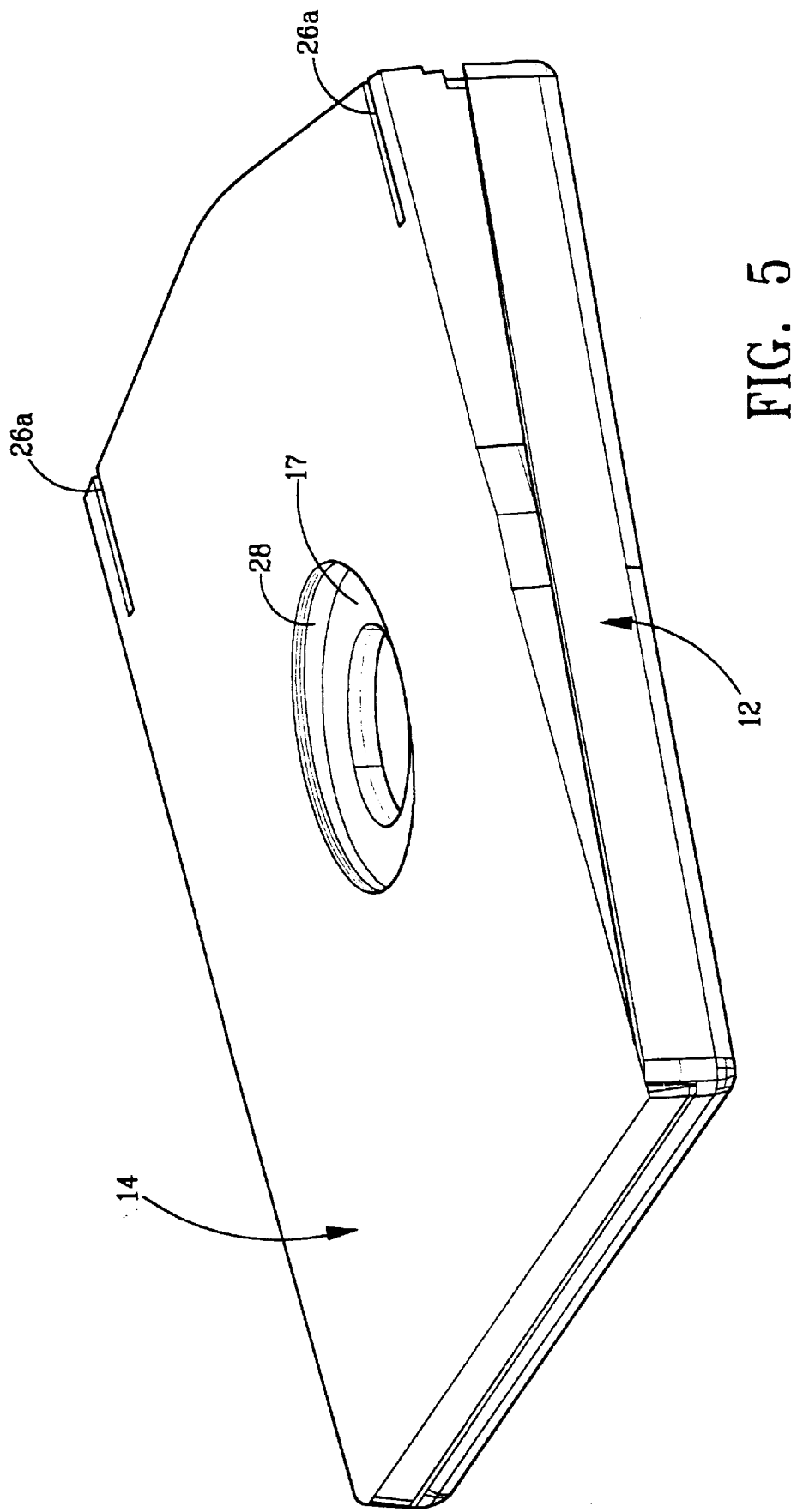
FIG. 5 shows a bottom view of the data recording cartridge of FIG. 1 in the open position.

Cartridge 10, according to the present invention, provides two embodiments of the cartridge slot 26a,b. Referring to FIGS. 1, 2, and 4, which show the first embodiment, bottom plate 40 has a groove 26a located beneath each latch assembly 20. Each of the two grooves 26a receive a disengaging tab 78a. Referring to FIG. 5, the bottom of cartridge 10 hanging grooves 26a is shown in an open position with drive 70 removed for clarity.

Figure 6:
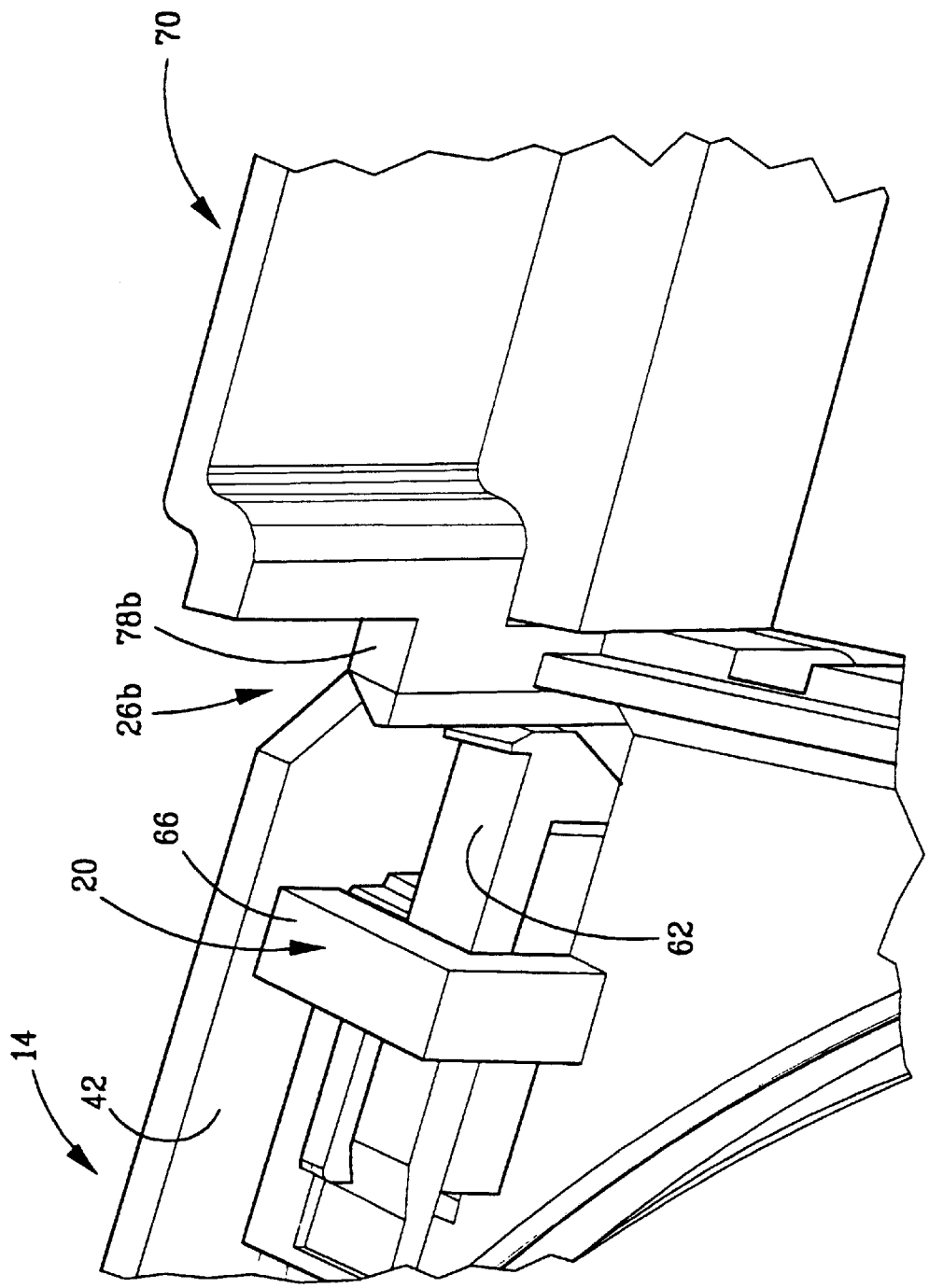
FIG. 6 shows a view of the latch mechanism according to a second embodiment for unlocking the data recording cartridge with the top shell removed.
Figure 7:
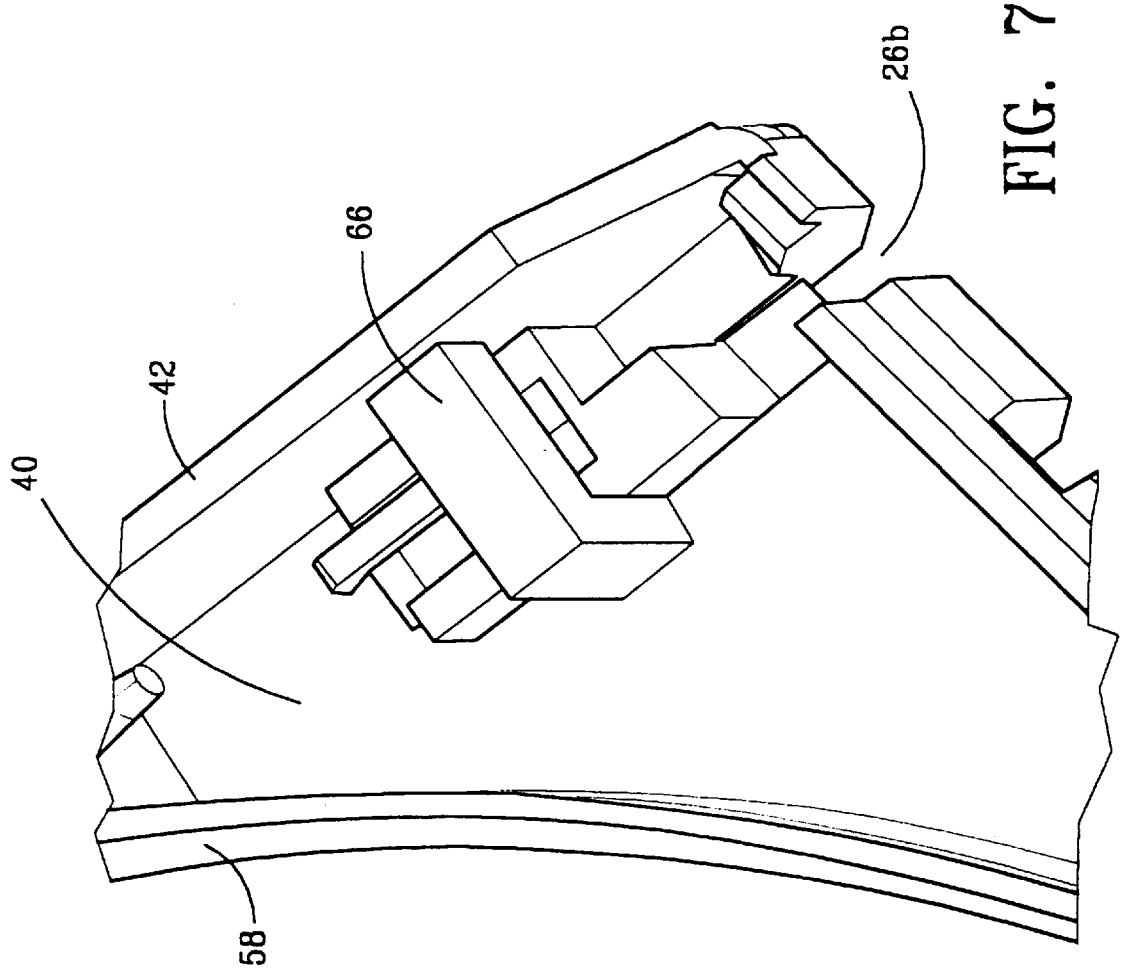
FIG. 7 shows a view of the latch assembly of FIG. 6, with the latch plate removed.

A second, preferred embodiment of the cartridge slot 26b is shown in FIGS. 6 and 7. In the second embodiment, a drive disengaging tab 78b urges a latch plate 62 through an opening 26b in the front of cartridge 10. FIG. 7 shows opening 26b with drive disengaging member 78b removed for clarity.

Figure 8:
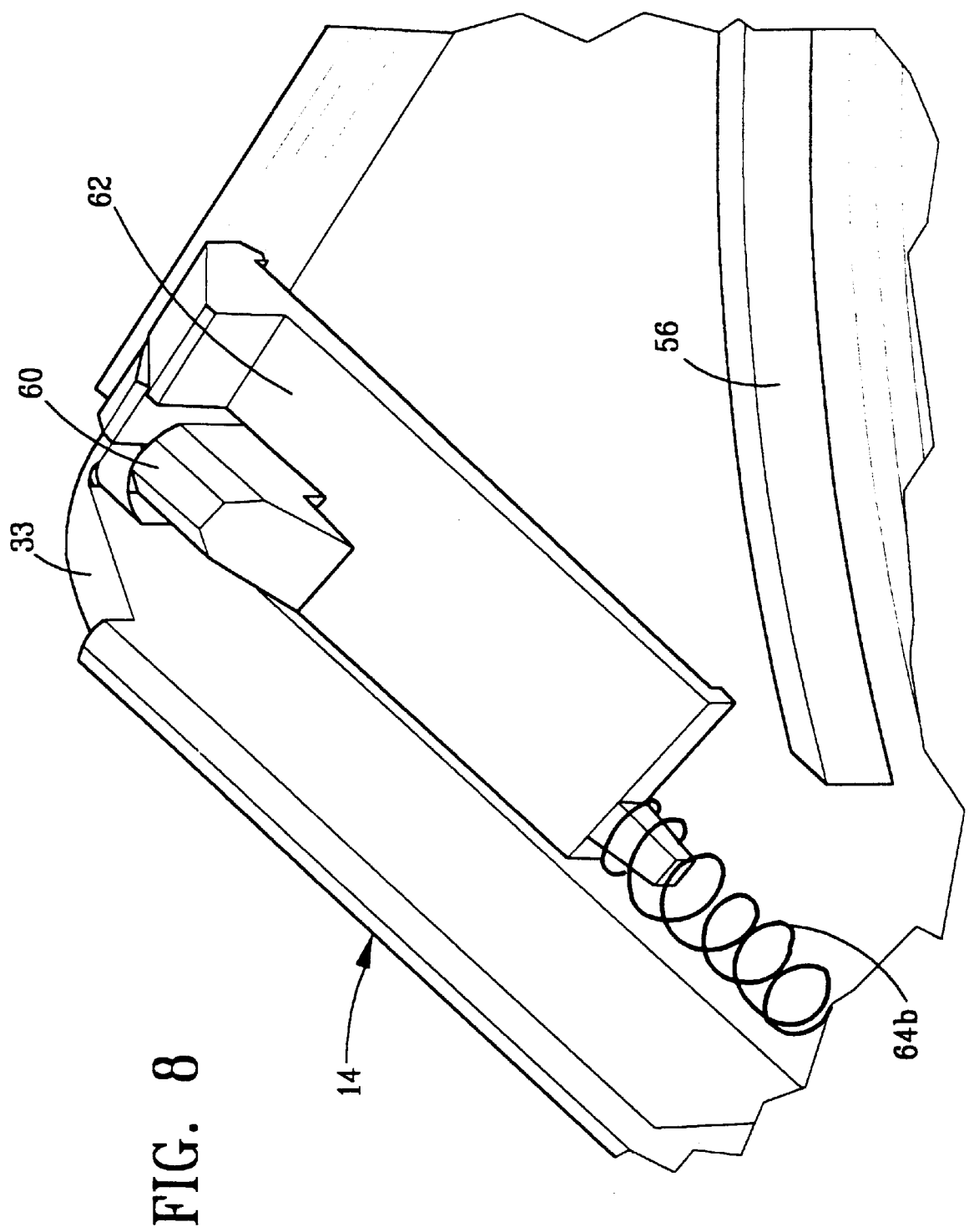
FIG. 8 shows a view of the latch assembly of FIG. 6 and the top shell in the locked position with the structural member of the latch and the bottom plate removed.

FIGS. 8 through 10 show two embodiments of latch assembly 20a,b, which includes a hook 60, a latch plate 62, a spring 64a,b, and a structural member 66. Preferably, two latch assemblies 20a,b are provided. Hook 60, latch plate 62, and structural member 66 are essentially the same whether employed in the first or the second embodiment of the latch. Hock 60 projects downward from top plate 30 so as to catch latch plate 62 while cartridge 10 is in the closed position. Structural member 66 is preferably formed integral with the bottom plate 40 and one of the bottom side walls 42. Latch plate 62 is urged forward by spring 64a,b and slides underneath structural member 66.

Referring to FIG. 9A, a preferred embodiment of latch assembly 20a is shown with the cartridge in the closed position with top shell 12 and hook 60 removed for clarity. A torsion spring 64a is retained by a boss 65. A catch 63, which is coupled to structural member 66 or bottom shell 12, limits latch plate 62 from sliding forward past a predetermined location. Latch plate 62 is assembled by sliding into the front of bottom shell 14 until caught by catch 63. FIGS. 10A and 10B show hook 60 protruding from top shell 12.

Figure 9B:
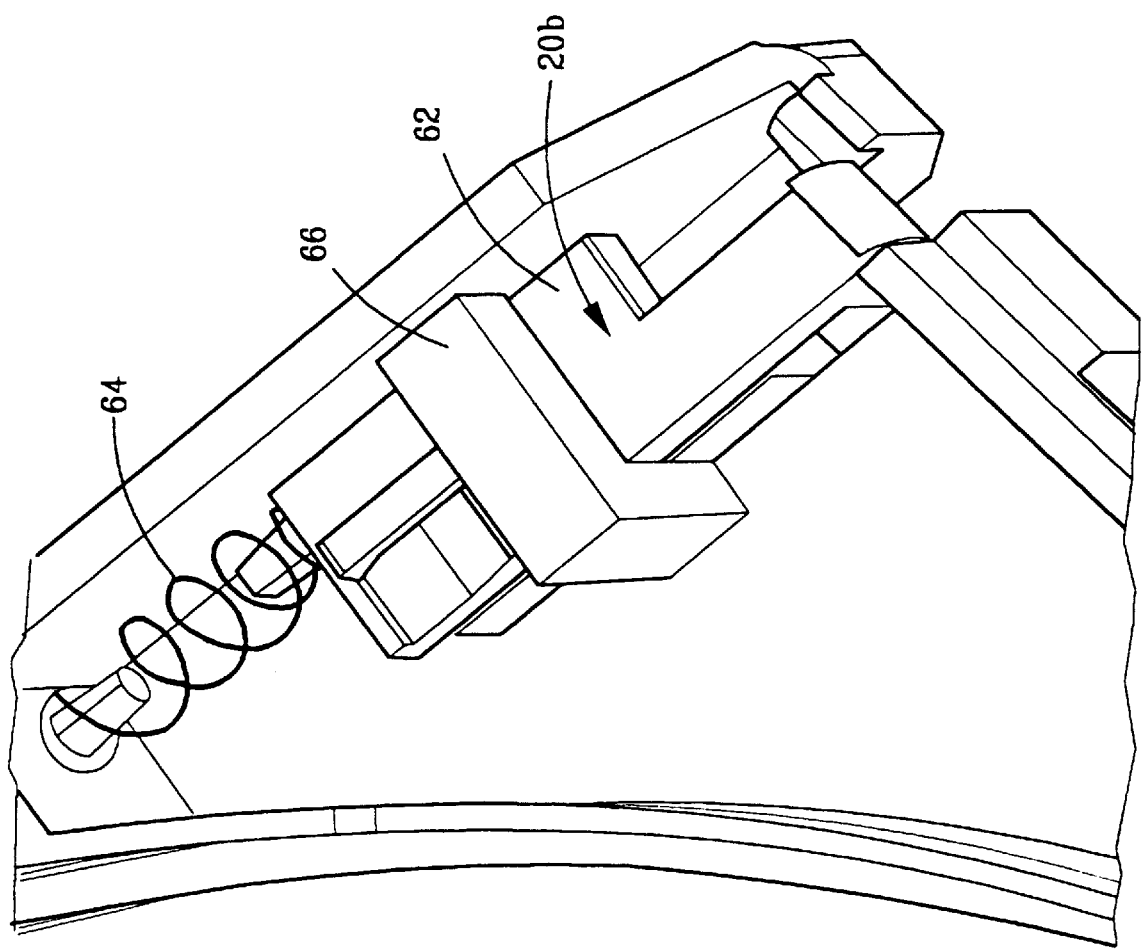
Figure 10B:
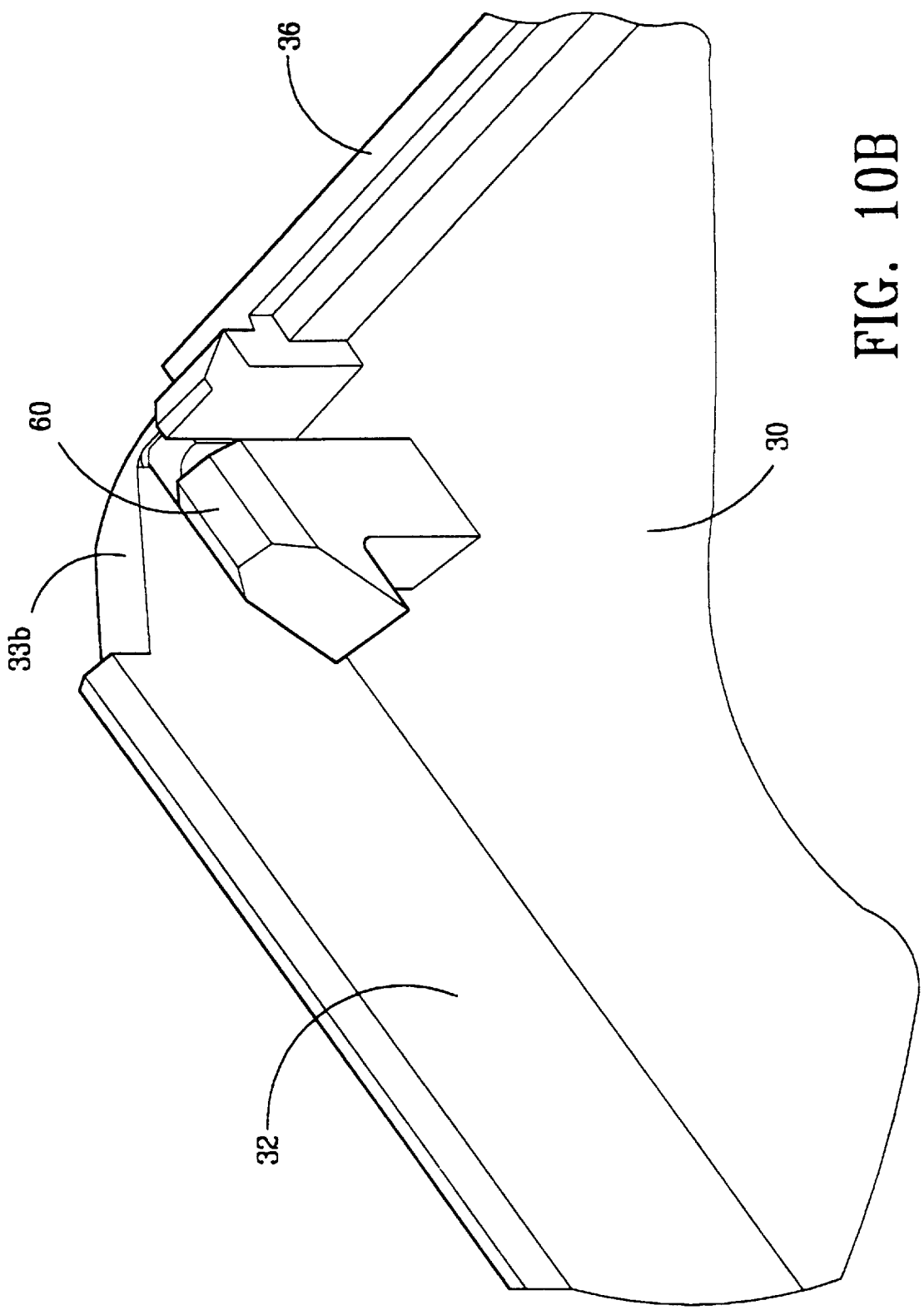

FIG. 8 and FIG. 9B show another embodiment of latch assembly 20b in the locked position with bottom shell 14 including structural member 66 removed for clarity, and with cartridge 10 in the closed position with top shell 12 removed for clarity, respectively. Latch assembly 20b has a helical compression spring 64b.

Figure 11A:
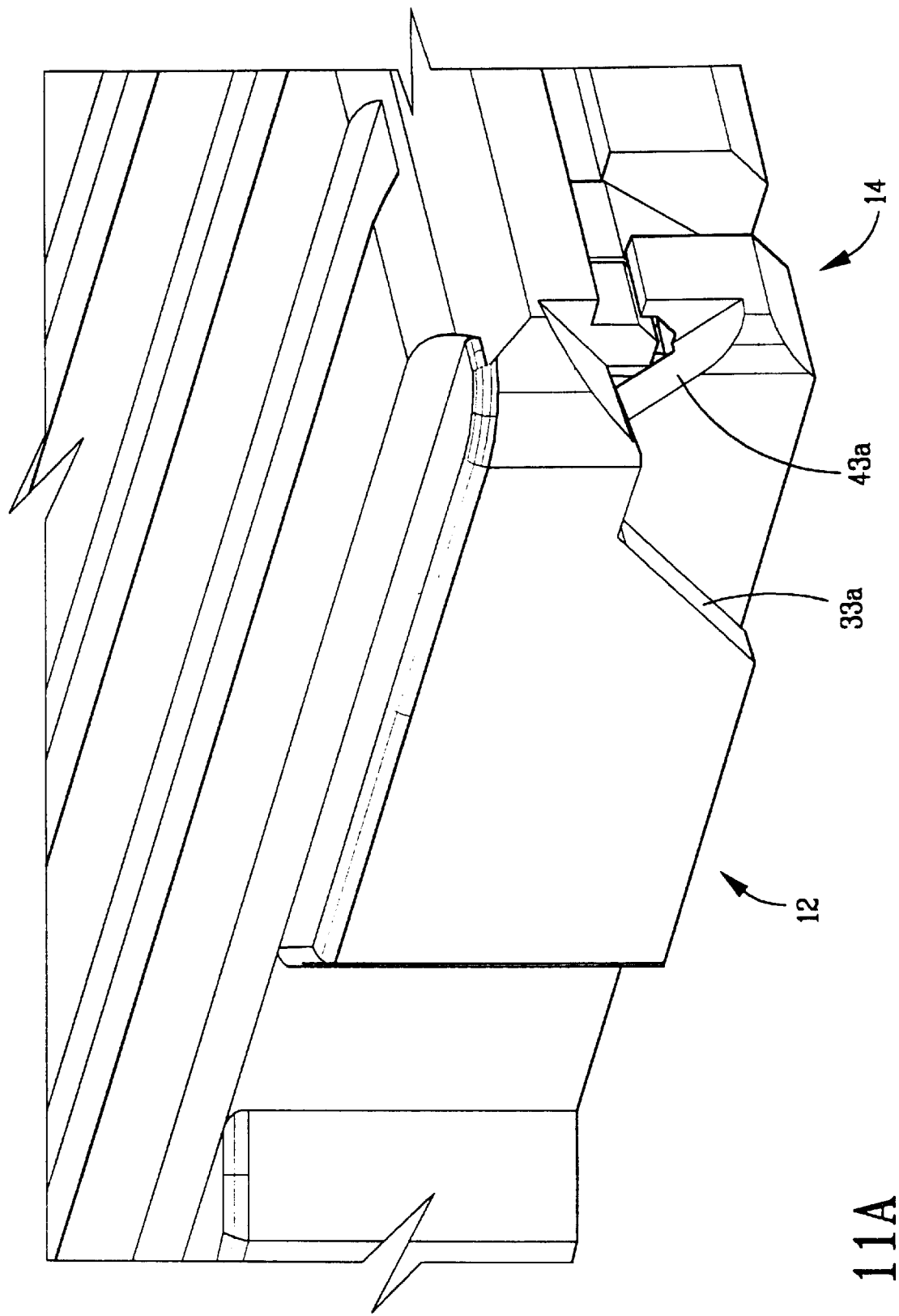
FIGS. 11A and 11B show the data recording cartridge in the closed position according to the second embodiment for unlocking the cartridge.
Figure 11B:
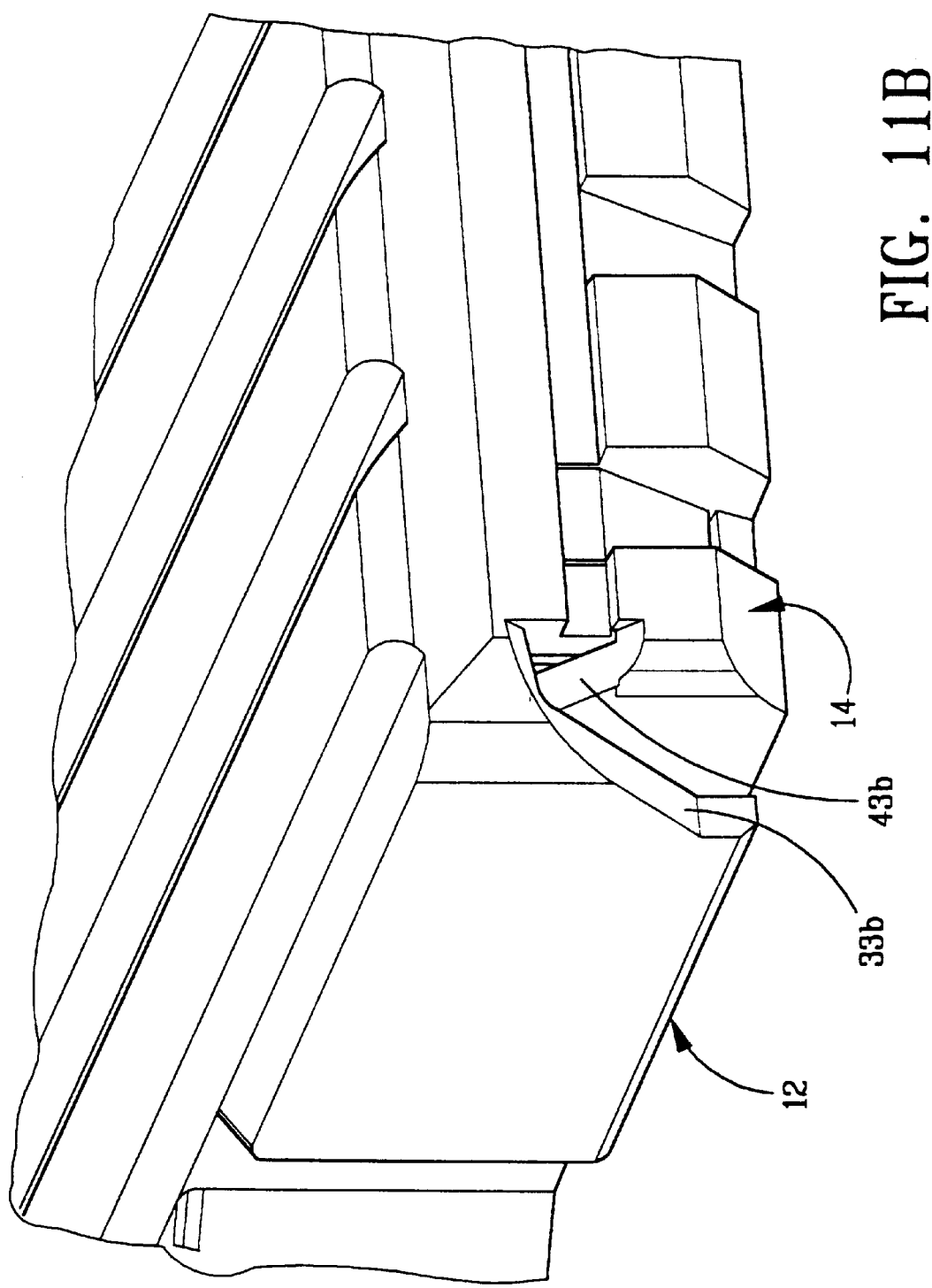
Figure 12A:
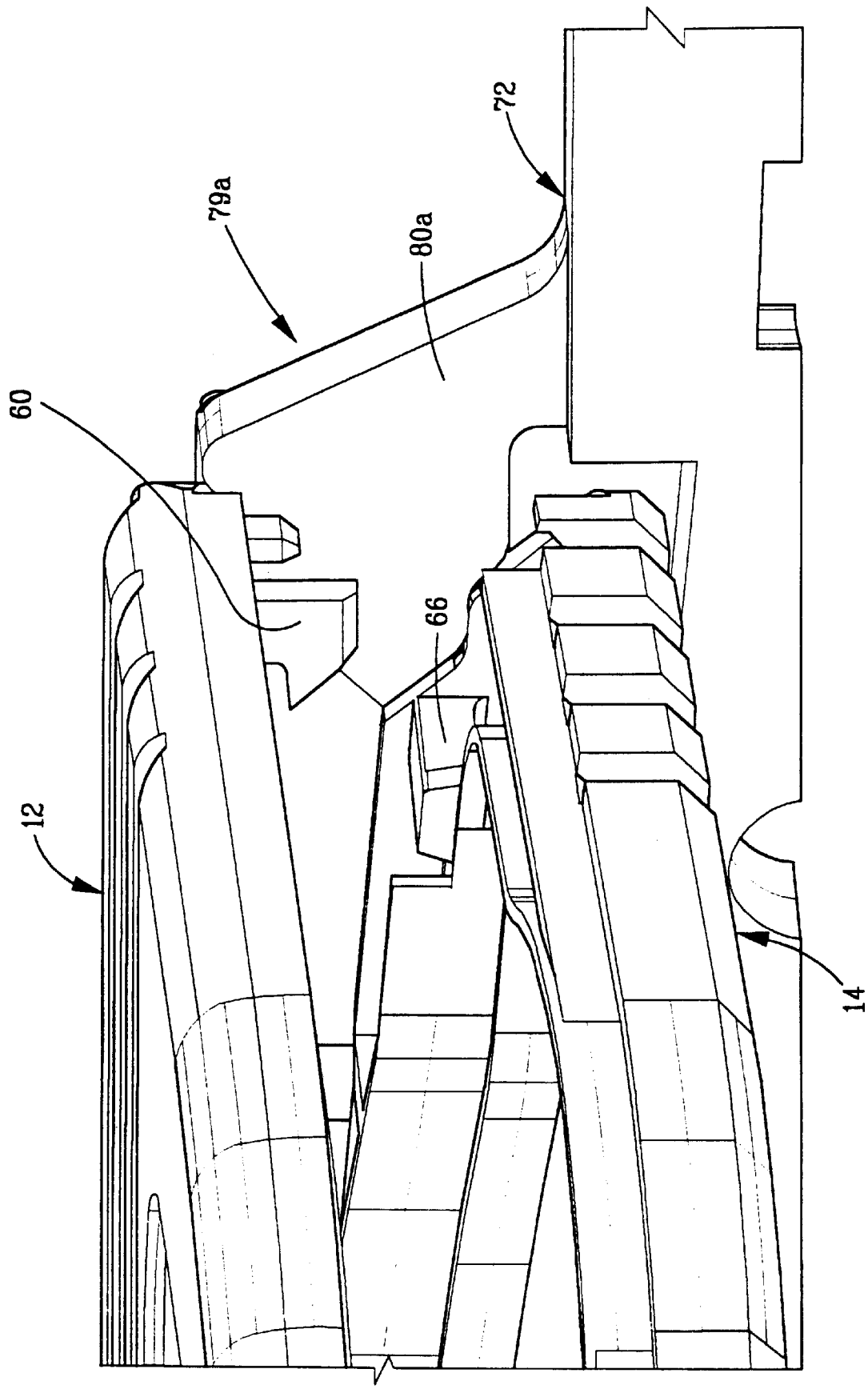
FIGS. 12A and 12B show the data recording cartridge of FIGS. 11A and 11B, respectively, in the open position.
Figure 12B:
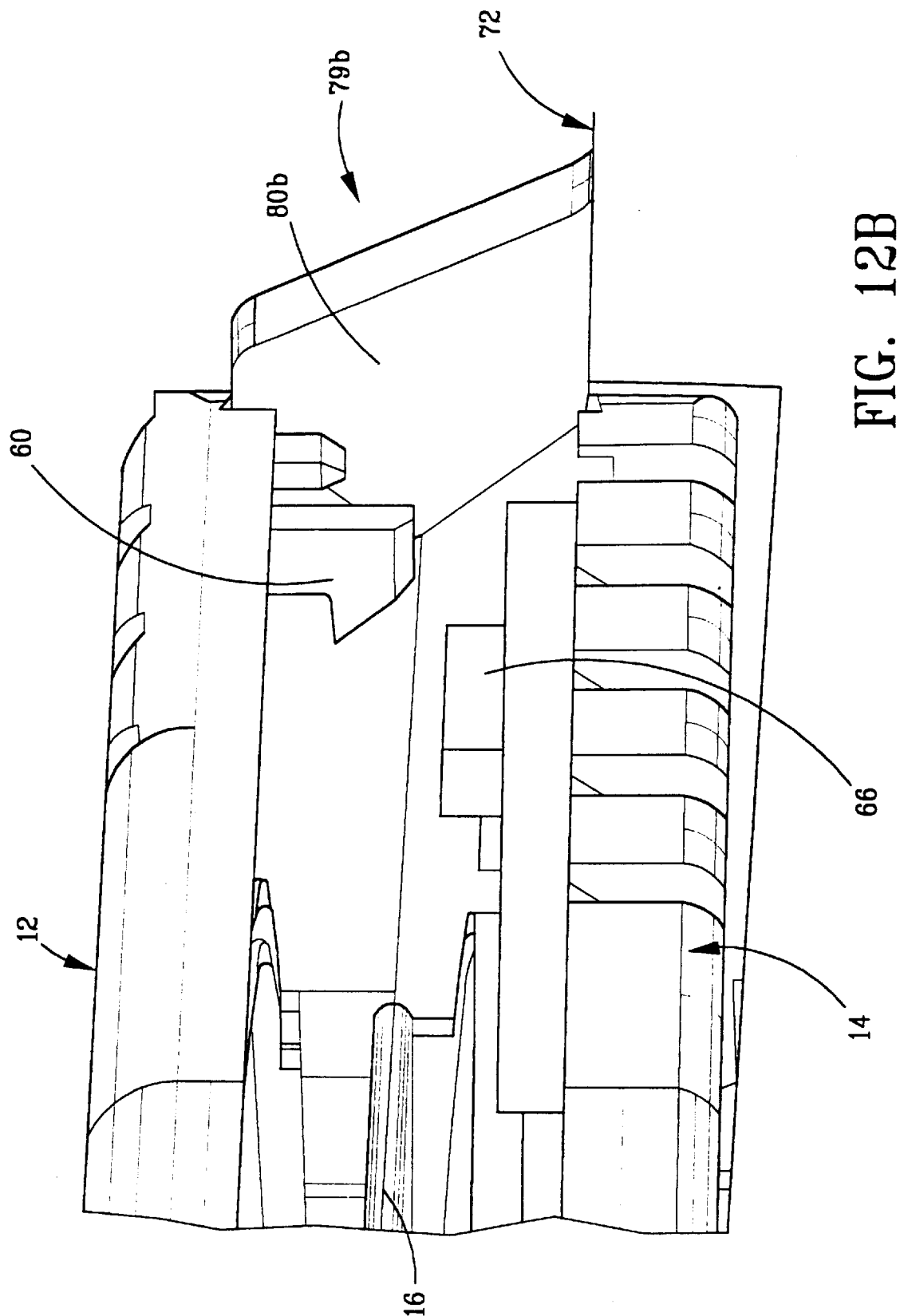
Figure 13A:
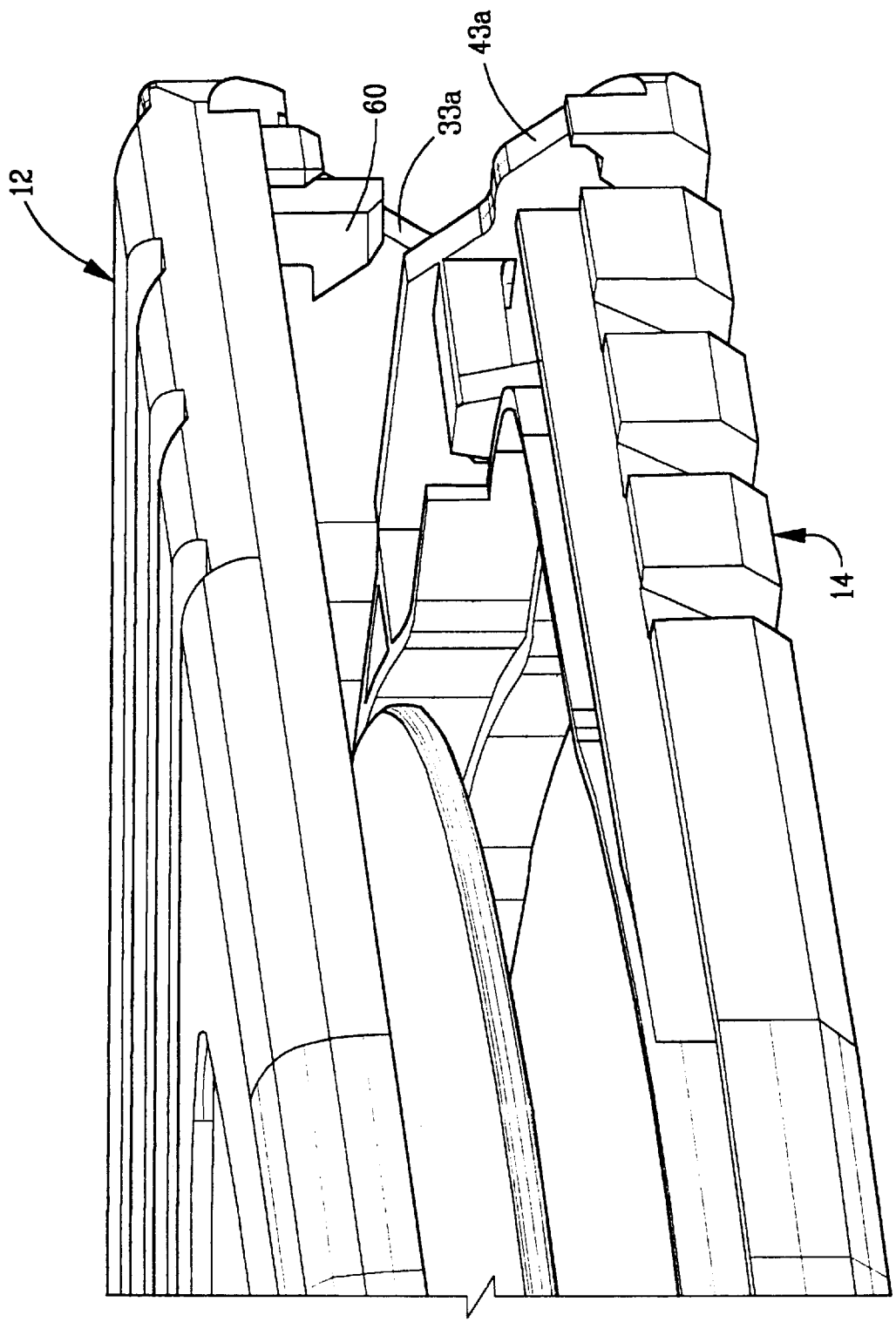
FIGS. 13A and 13B show the cartridge of FIGS. 12A and 12B, respectively, in the open position with the opening wedges removed.
Figure 13B:
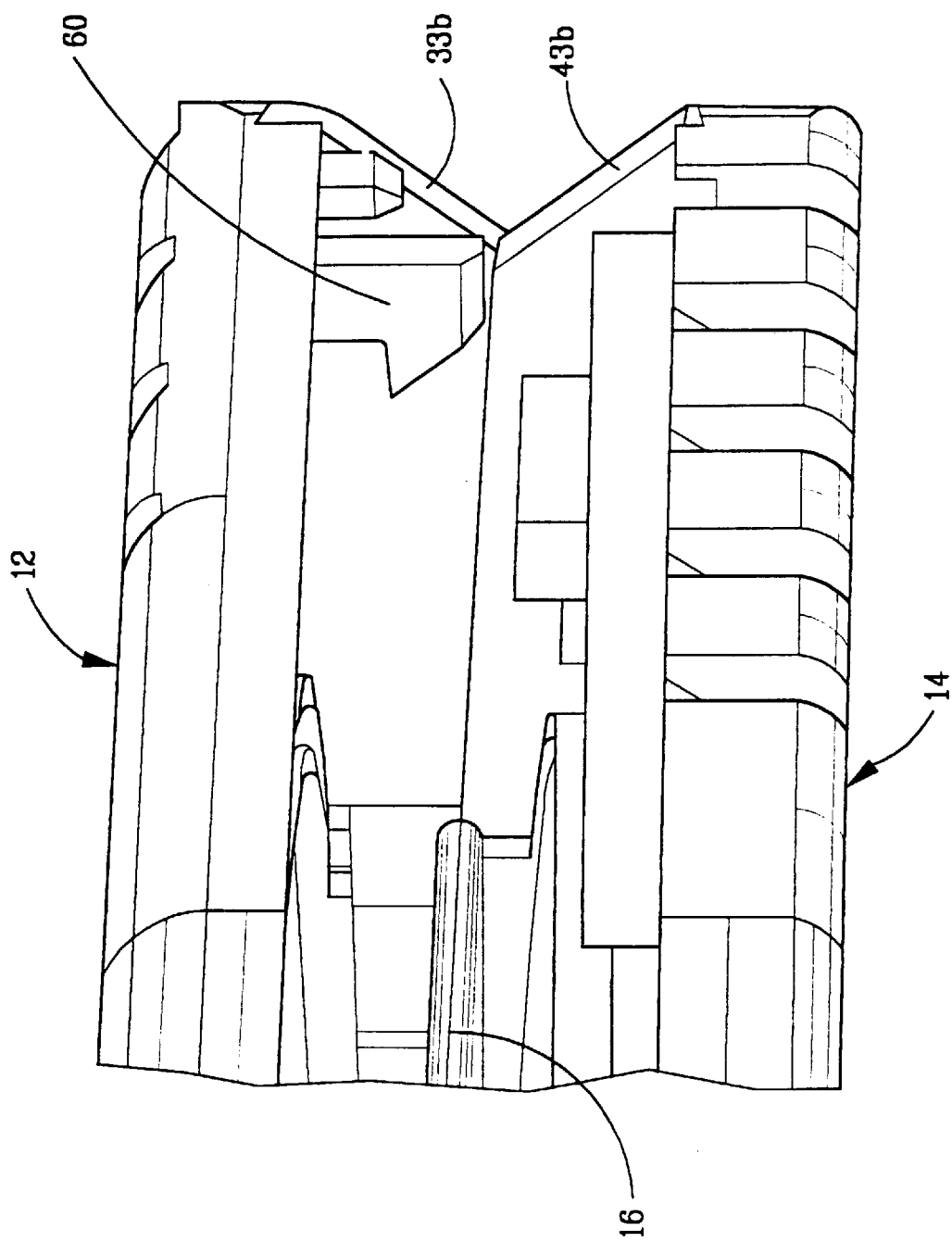

Referring to FIGS. 11A, 12A, and 13A, a preferred opening mechanism 79a according to the present invention is shown. Each of top side walls 32 and bottom side walls 42 form a ramp 33a and 43a, respectively, at the front end of cartridge 10 for receiving a drive opening wedge 80a, which is described as part of drive 70 hereinbelow. Each ramp 33a and 43a has a surface that has a substantially horizontal portion that corresponds to an opposite, substantially horizontal portion of wedge 80a. The horizontal portions enable opening wedge 80a to open cartridge 10 a predetermined amount without precise positioning of wedge 80a. FIGS. 11B, 12B, and 13B show an alternate opening mechanism 79b which includes ramps 33b and 43b, and wedge 80b. In addition to ramps and wedges, the present invention encompasses other mechanisms that serve the same function, such as pins for inserting into holes in the shells, arms for pushing the shells apart, springs within the shell, and magnetic actuators.

Figure 15:
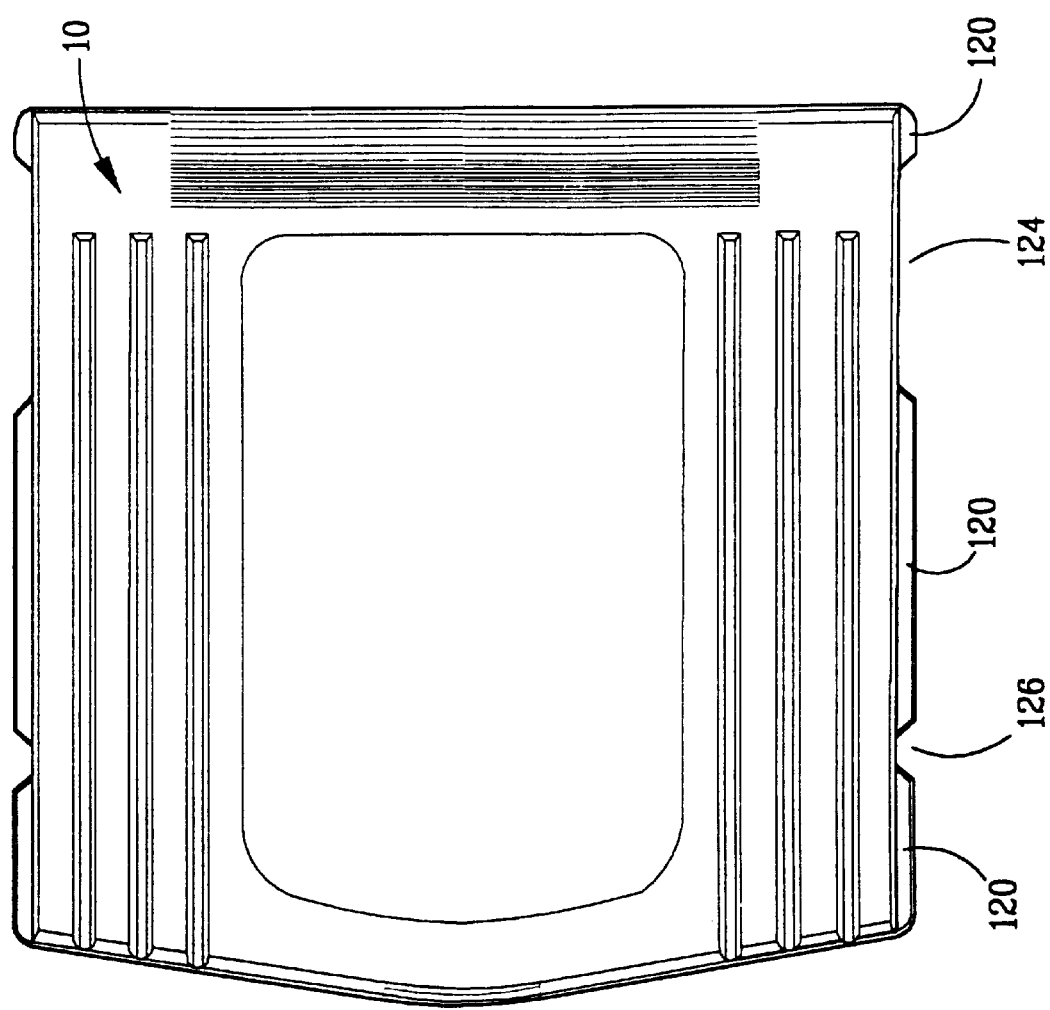
FIG. 15 shows a top view of the cartridge.

As shown in FIG. 15, cartridge 10 includes two translating members 120 disposed on two sides of cartridge 10. Each translating member 120 forms two notches therein, a front notch 126 and a back notch 124.

Figure 16:
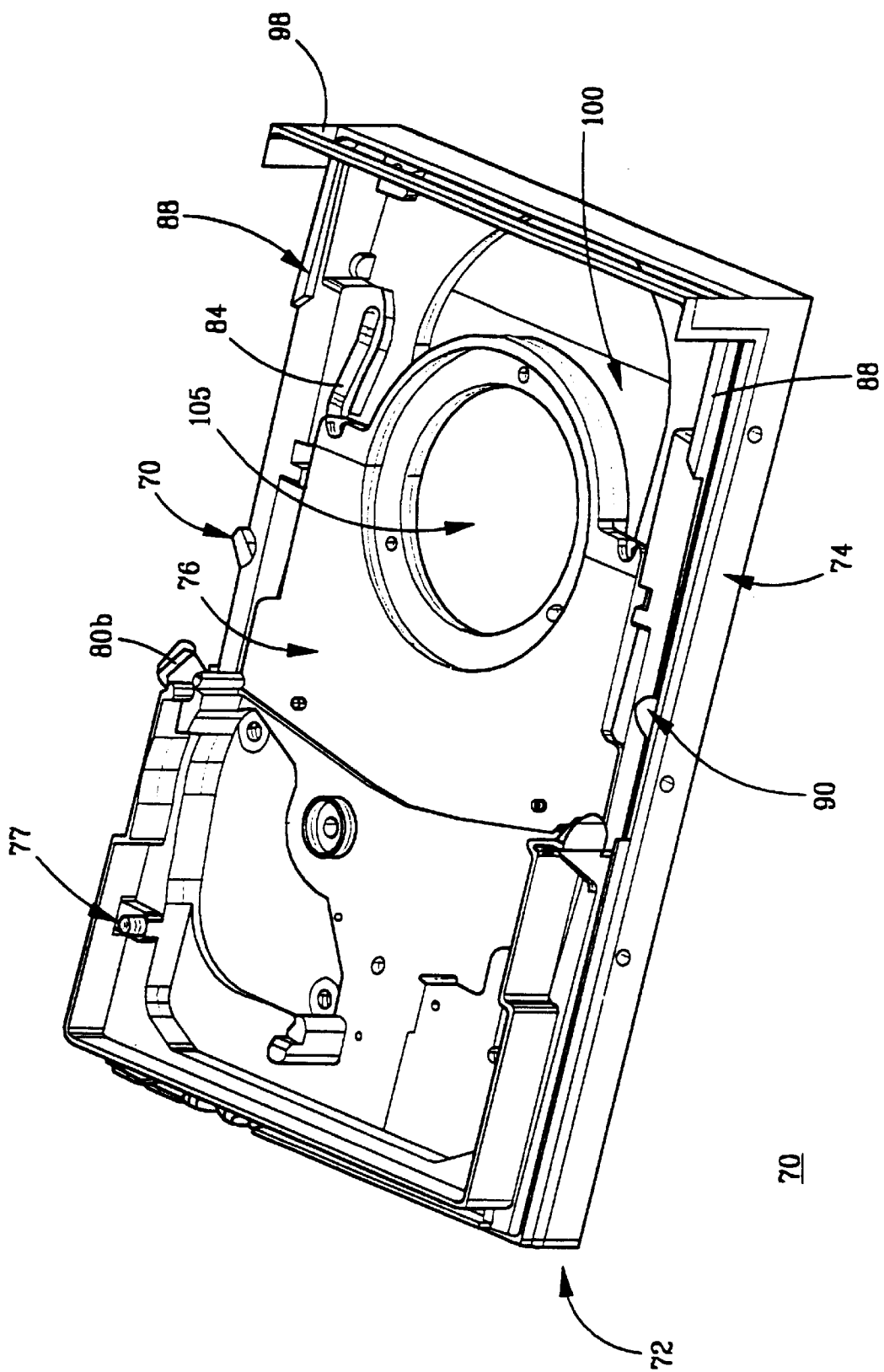
FIG. 16 shows the drive according to another aspect of the present invention.
Figure 17:
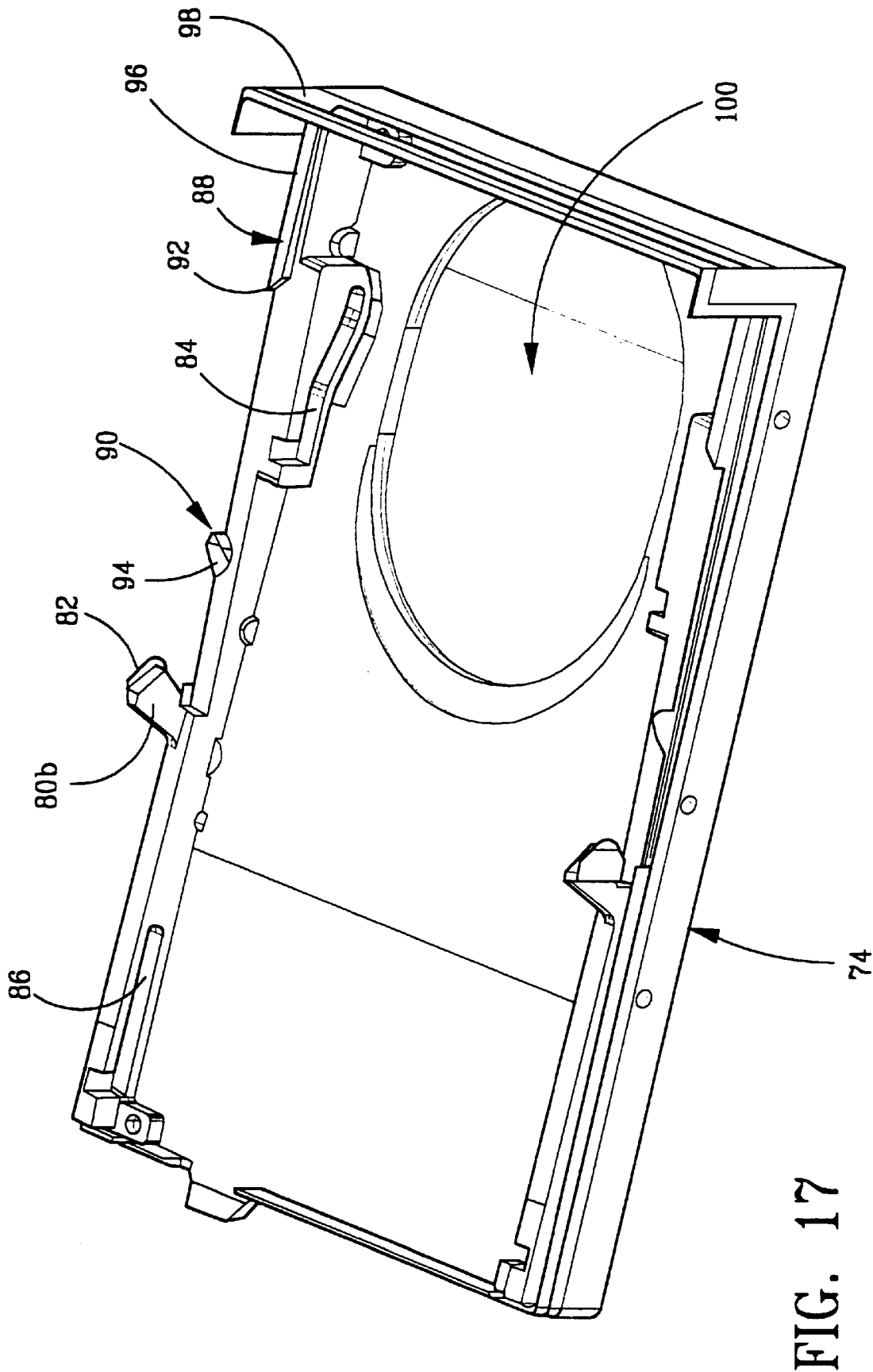
FIG. 17 show a base of the drive of FIG. 16.
Figure 22:
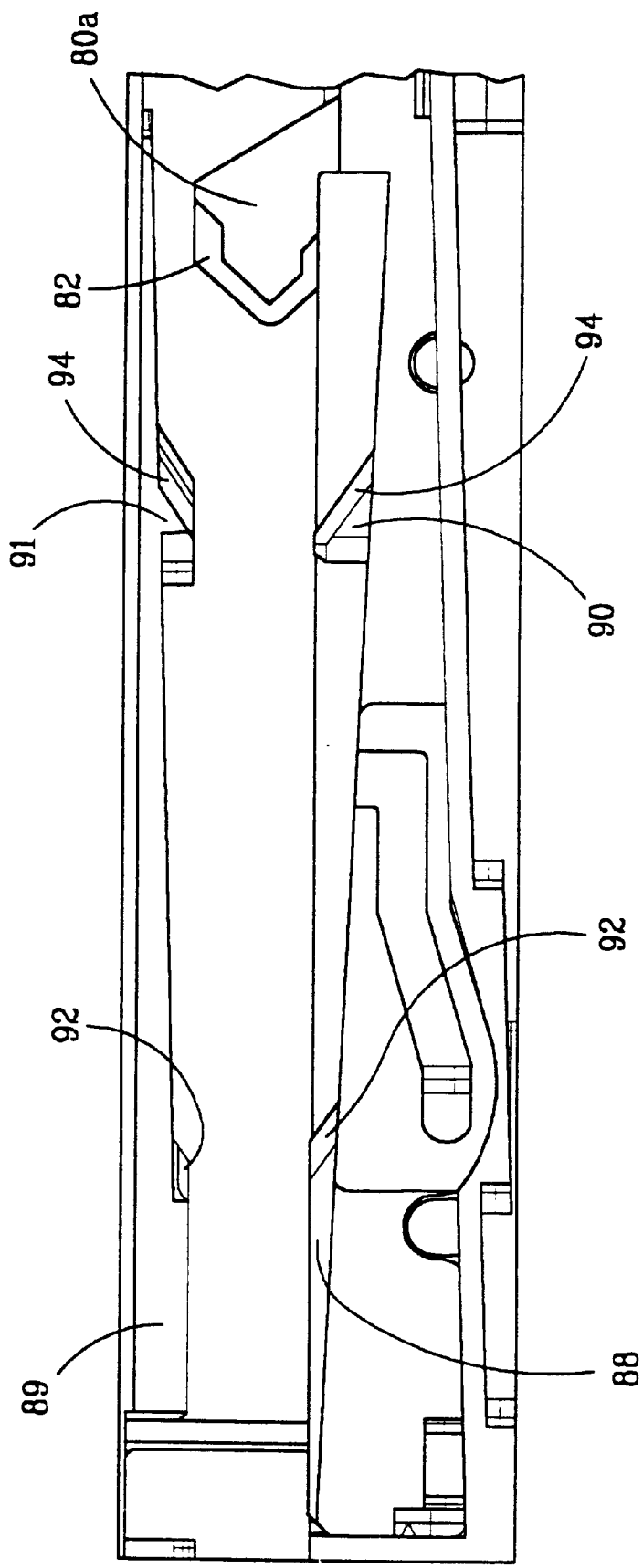
FIG. 22 shows an internal view of the drive.

FIG. 16 shows a drive 70 to house and operate the cartridge 10, in accordance with another aspect of the present invention. Drive 70 has a structure 72 that includes a bass 74 and a platform 76. As shown in FIGS. 17 and 22, the base 74, which is fixed within drive 70, includes two wedges 80a,b, (only embodiment 80a is shown in FIG. 17), two proximal guide tracks 84, two distal guide tracks 86, two bottom proximal cartridge guides 88, two bottom distal cartridge guides 90, two top proximal cartridge guides 89, two top distal cartridge guides 91, a cartridge slot 98 and an elongate recess 100. Each wedge 80a,b preferable includes one wedge shield 82. Each proximal cartridge guide 88, 89 has a proximal incline 92 that faces the distal end of drive 70, and a top surface 96. Each distal cartridge guide 90, 91 has a distal incline 94 that faces the (distal end of drive 70.

Figure 18:
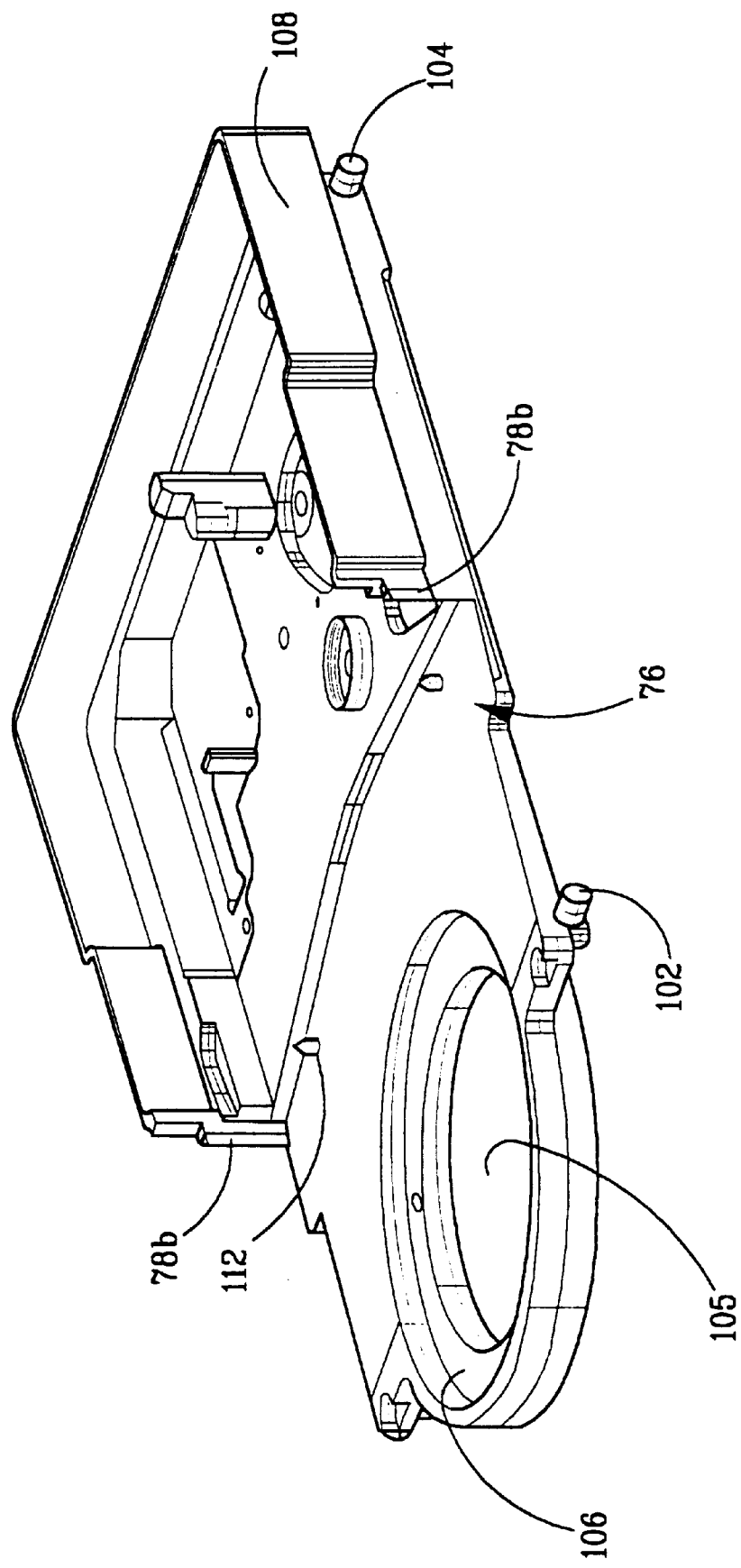
FIG. 18 shows a platform of the drive of FIG. 16.
Figure 19:
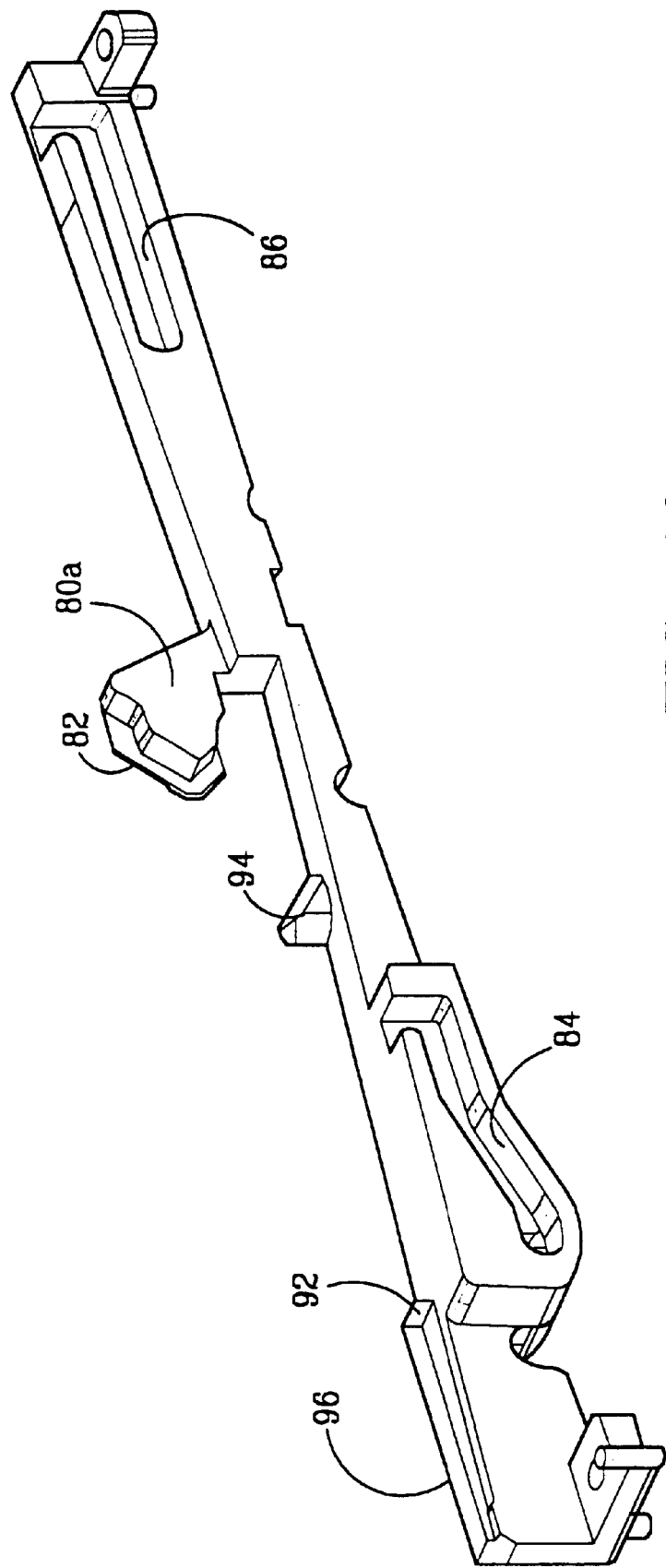
FIG. 19 shows a portion of the base of FIG. 17.

Referring to FIG. 18, platform 76 includes two proximal guide pins 102, two distal guide pins 104, a motor aperture 105, a spindle motor pad 106, sealing means 108, two disengaging members 78a,b, (only embodiment 78b is shown in FIG. 18), and two securing pins 112. Proximal guide pins 102 are inserted into proximal guide tracks 84 of base 74, and distal guide pins 104 are inserted into distal guide tracks 86 of base 74 to enable the platform 76 to slide on the base 74. During insertion of cartridge 10, the platform 76 is located at the proximal end of guide tracks 84 and 86 and the proximal guide track 84 is contoured so as to enable the platform 76 to provide adequate vertical space for cartridge 10 insertion. The proximal incline 92 and distal incline 94, as shown in FIG. 19, form a cartridge closing mechanism. Cartridge slot 98 has a vertical dimension that permits cartridge 10 to pass through in a closed position, but not large Enough to allow cartridge 10 to pass through in an open position.

Drive 70 also includes a drive head assembly 77, shown in FIG. 16, for reading and recording data from the recording medium 16. It is understood that drive head assembly 77 may, be any conventional head assembly, for example a magnetic head or an optical device, that fits the clearance requirements of the drive head opening 24. In many circumstances, including for example, cartridges in which the data recording medium 16 has two or more stacked disks, drive head assembly 77 will include two or more heads or optical devices.

In addition to sealing means 108 and wedge shield 82 according to the present invention, drive 70 may employ conventional covers to isolate cartridge 10 and/or medium 16. Because the drive 70 and/or cartridge 10 typically has internal filters for removing particulate matter, the air within the drive will contain a concentration of particulate matter lower than both air within the electronic equipment that houses the drive and ambient air outside of the electronic equipment. Therefore, opening the cartridge 10 within the drives 70 keeps the data recording medium 16 substantially free from particulate contamination because the medium 16 is exposed to filtered air.

The operation of the cartridge 10 and drive 70 will now be described. The recording medium 16 is kept substantially free of particulate matter by labyrinth seal 22, top holding member 67 and bottom holding member 68 with chamfered portion 69, while cartridge 10 is in the closed position. Furthermore, recording medium 16 is protected from shock and vibration because disk hub 17 and surface 15 are held between holding members 67 and 68 and chamfered portion 69 while the cartridge 10 is closed, as shown in FIG. 14.

Cartridge 10 is inserted into drive 70 through cartridge slot 98. Cartridge translating member 120 slides on top of bottom proximal cartridge guides 88 and bottom distal cartridge guides 90, and beneath top proximal cartridge guides 89 and top distal cartridge guides 91, until it encounters disengaging member 78a,b disposed on platform 76. Disengaging members 78a,b urge latch plate 62 toward the back end of cartridge 10. Latch plate 62 compresses spring 64a,b as latch plate 62 slides within structural member 66. The movement of latch plate 62 releases hook 60, thereby unlocking top shell 12 from bottom shell 14.

As cartridge 10 moves further towards the distal end of drive 70, cartridge 10 urges platform 76 to slide on base 74 toward the distal end of drive 70. After the unlocking of latch 20, platform 76 is guided by proximal guide track 84 so as to move platform 76 toward the distal end of drive 70 and vertically upward toward cartridge 10 so as to enable hub 17 to receive the spindle motor mounted on motor pad 106.

Figure 20:
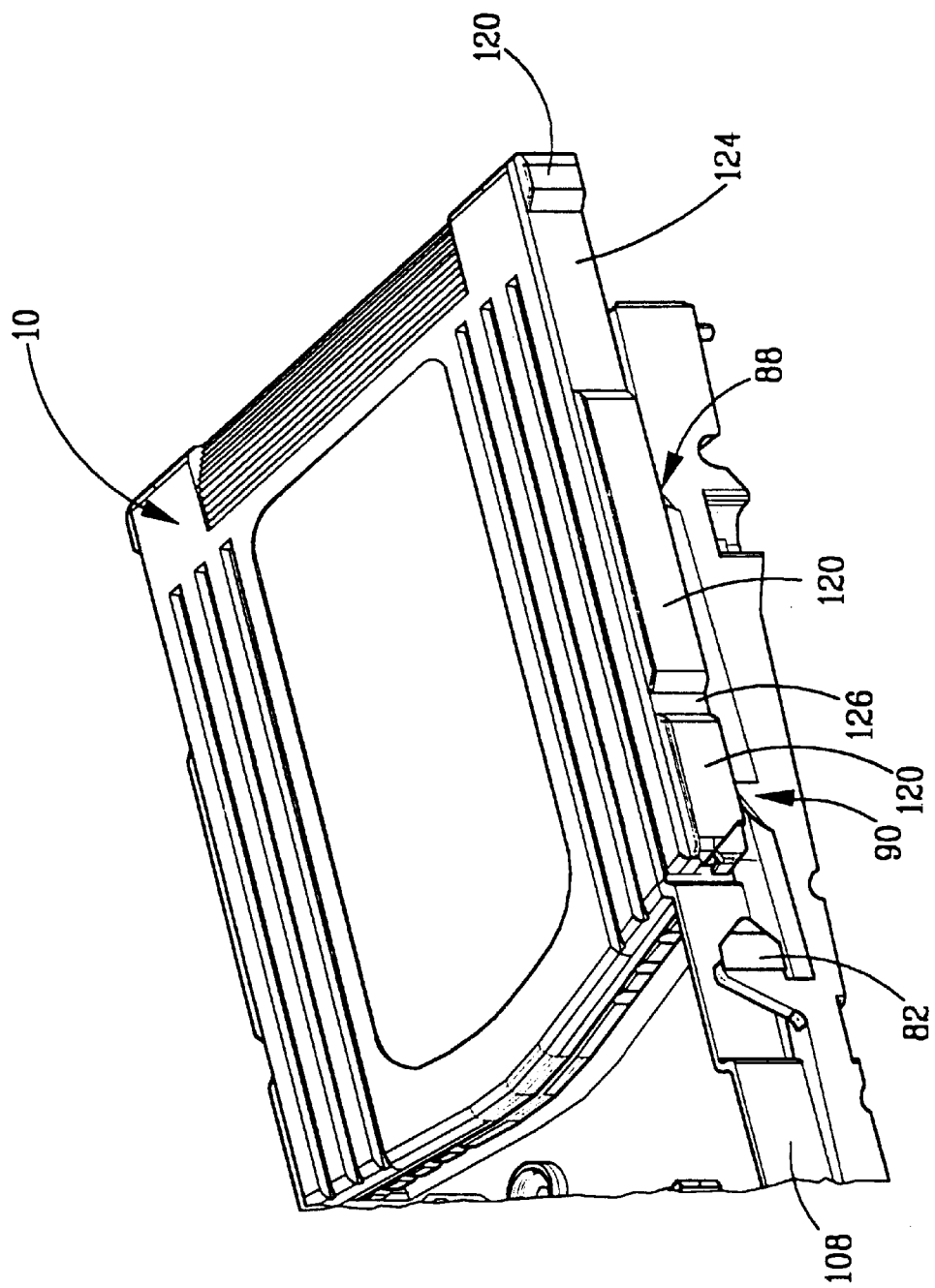
FIG. 20 shows the cartridge as it is inserted into the drive, with a portion of the drive removed for clarity.
Figure 23:
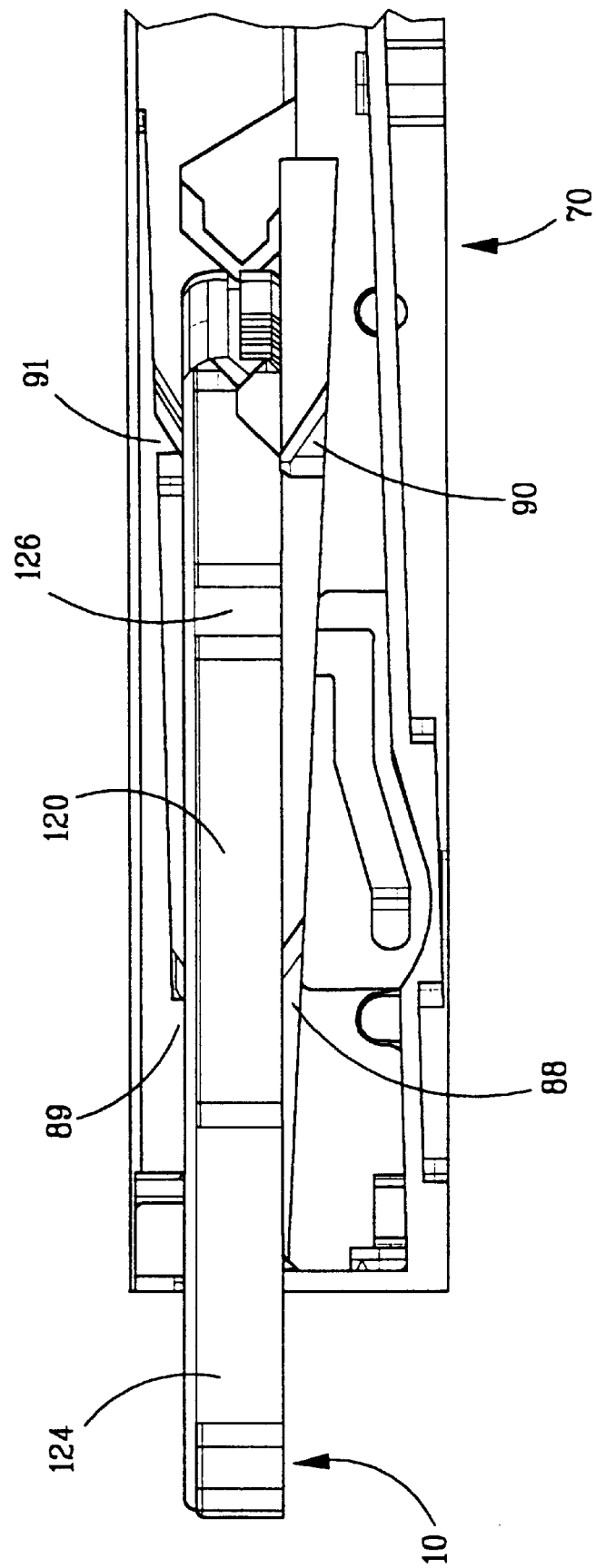
FIG. 23 shows an internal view of the drive with the cartridge partially inserted.

FIG. 20 shows cartridge 10 as it slides over bottom cartridge guides 88 and 90, with top cartridge guides 89 and 91 removed for clarity. Disengaging members 78b are shown to have engaged latch assembly 20, thereby unlocking cartridge 10, although the cartridge has not yet been pivoted to an open position and is prevented from opening by cartridge guides 88, 89, 90, and 91, as shown in FIG. 23. FIG. 23 also shows cartridge 10 riding between guides 88 and 89, and between guides 90 and 91. When cartridge 10 translates farther into drive 70, notches 124, 126 on translating members 120 of cartridge 10 align with cartridge guides 88, 89, 90 and 91 on base 74. Specifically, a front notch 126 aligns with distal cartridge guides 90, 91 and a rear notch 124 aligns with proximal cartridge guides 88 and 89, as partially shown in FIG. 21. Such alignment, which enables the bottom shell 14 of cartridge 10 to move vertically downward within drive 70, occurs approximately simultaneously with the opening of cartridge 10.

Cartridge 10 is opened by wedges 80a,b which force apart top shell 12 and bottom shell 14. Preferably, wedges 80a ride up ramps 33a and 43a until the respective horizontal portions meet so as to open cartridge 10 a predetermined dimension of opening 24. Alternatively, wedges 80b ride up the ramps 33b and 43b to a predetermined position corresponding to a desired dimension of drive head opening 24. Preferably, when cartridge 10 is in the fully open position, top shell 12 and bottom shell 14 form an angle of 4° therebetween. Because of vertical space considerations bottom shell 14 preferably forms an angle of 2½° with this plane of medium 16, and the top shell forms an angle of 1½° with the plane of medium 16.

Figure 21:
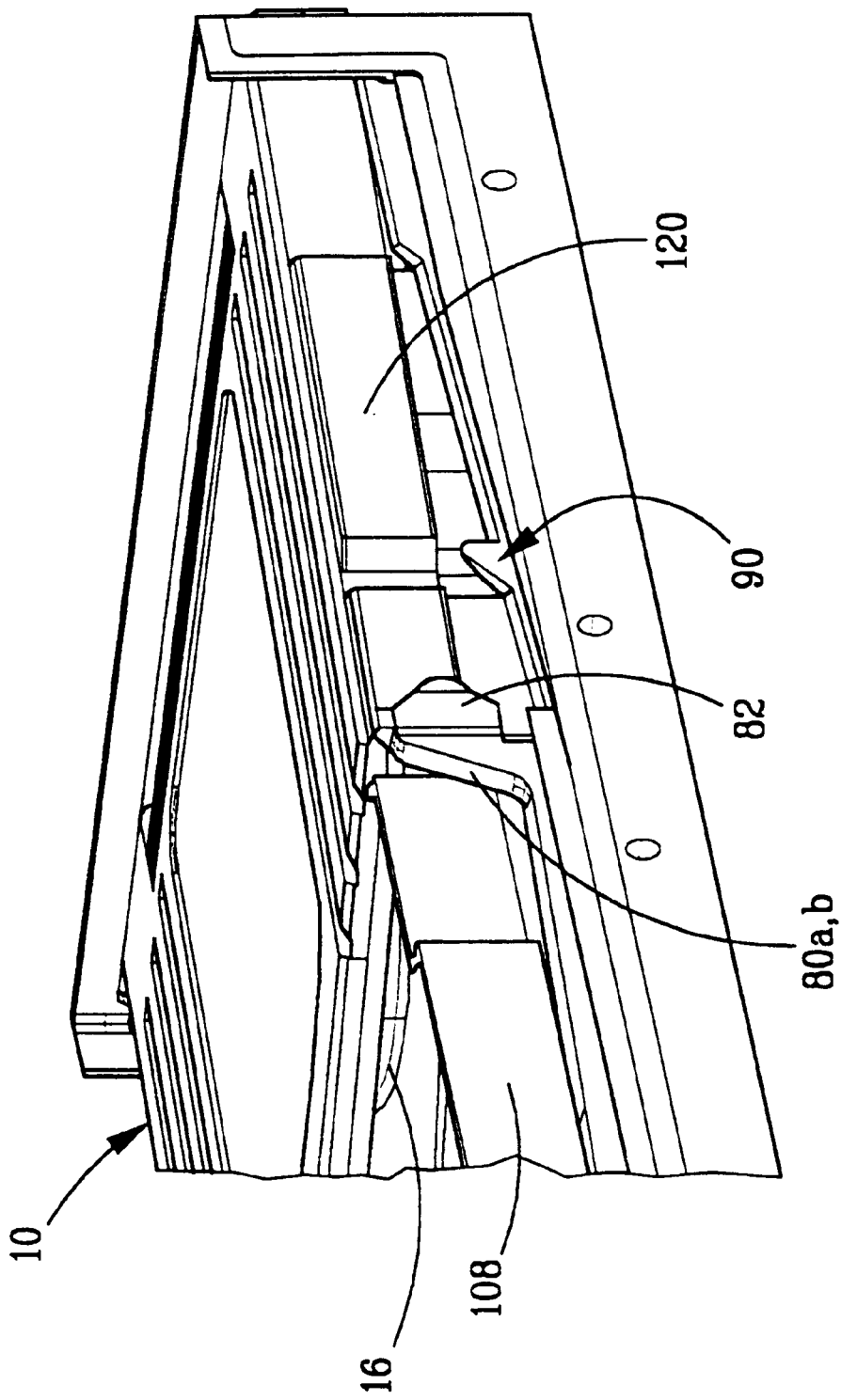
FIG. 21 shows the cartridge fully inserted into the drive in an open position, with a portion of the drive removed for clarity.

As shown in FIG. 21, the open cartridge 10 provides space between top shell 12 and bottom shell 14 to enable recording medium 16 to rotate. Sealing means 108 and a top shield (not shown) disposed on the platform 76 inhibit particles from communicating with recording medium 16. Furthermore, wedge shields 82 at least partially cover the opening formed at the side of cartridge 10 when cartridge 10 is in an open position.

Ejection of cartridge 10 from drive 70 will now be described. After the heads have been removed from recording opening 24, cartridge 10 moves outward through cartridge slot 98. As the cartridge is urged outward, portions of cartridge translating members 122 adjacent notches 124 and 126 urge against the proximal inclines 92 and distal inclines 94, respectively. Inclines 92 and 94 of top guides 89 and 91 urge against top shell 12 while simultaneously, inclines 92 and 94 of bottom guides 88 and 90 urge against bottom shell 14 so as to pivot top shell 12 and bottom shell 14 thereby forcing cartridge 10 into a closed position. Because cartridge slot 98 is sized so as to prohibit cartridge 10 from passing therethrough in an open position, cartridge 10 is pivoted closed by cartridge slot 98 if cartridge 10 has not been fully closed by cartridge guides 88, 89, 90 and 91. Moreover, it is understood that the closing means are not limited to those described hereinabove. Specifically, the closing means of the present invention encompasses rollers, arms, actuators, triggers, motors, and the like that may be moved by springs, magnets, induction, and the like.

Figure 25B:
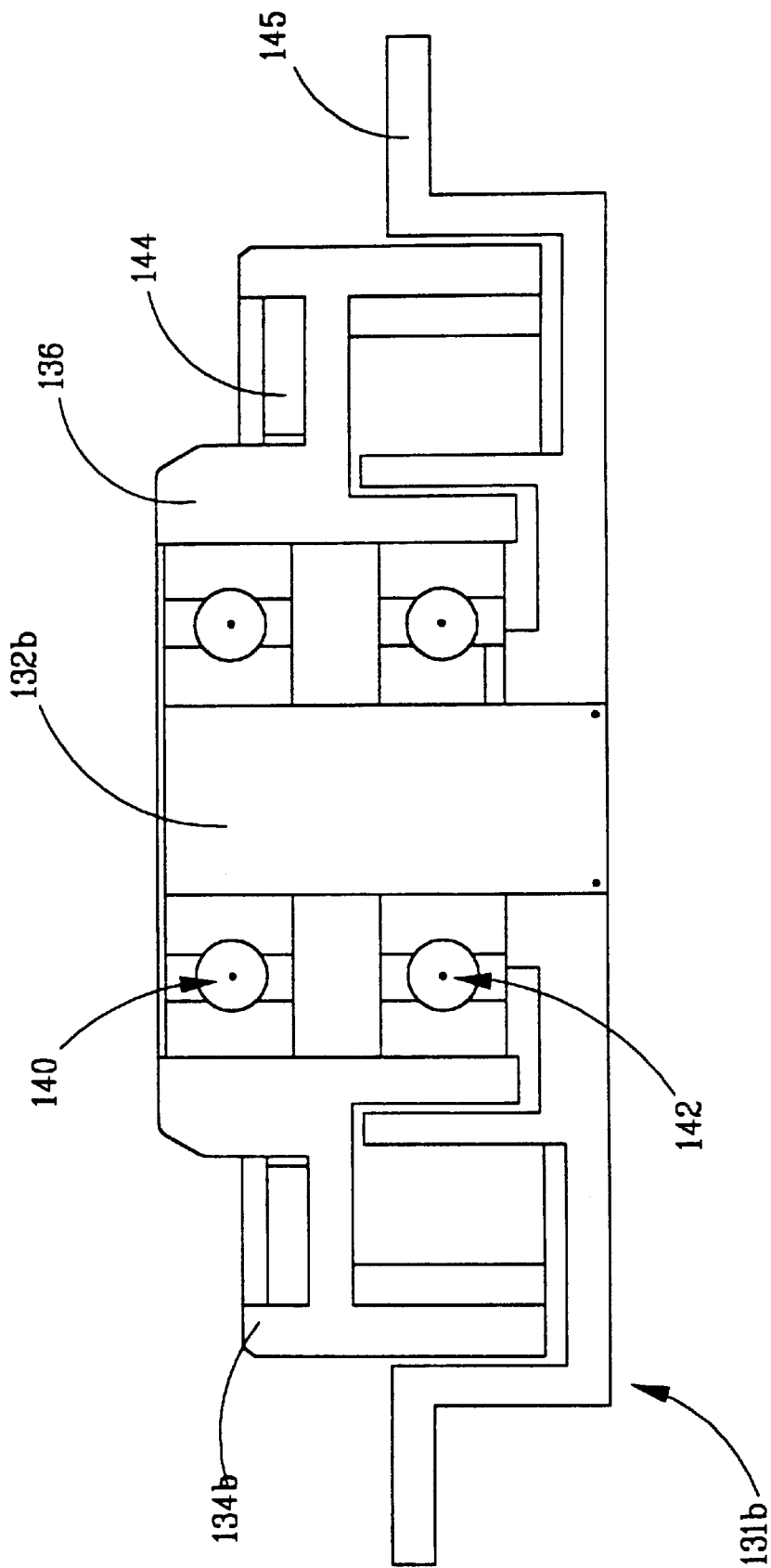

According to another aspect of the present invention, a hub having an enlarged center hollow and a spindle motor for engaging the hub are provided. Referring to FIG. 25A and FIG. 25B, two embodiments of the present invention are shown. A first embodiment, shown in FIG. 25A, employs the present invention in a rotating-shaft type spindle motor 131a having a rotatable shaft 132a, a rotor 134a, a top bearing 140, a bottom bearing 142, and clamp magnets 144. Spindle motor 131a is preferably mounted to the underside of motor pad 106 of drive 70, or pressed into motor aperture 105. Hub 17 has a center hollow 130 having an inside diameter larger than the outside diameter of top bearing 140. Rotor 134a is rigidly coupled to shaft 132a. Rotor 134a has a cylindrical top protrusion 136 that forms a cylindrical cavity 138 on the underside of rotor 134. Cavity 13E has a sufficiently large diameter to permit at least as portion of top bearing 140 to jut into cavity 138.

A second embodiment, shown in FIG. 25B, employs the present invention in a fixed-shaft type spindle motor 131b having a fixed shaft 132b, a rotor 134b, a top bearing 140, a bottom bearing 142, and clamp magnets 144. FIG. 25B shows a mounting flange 145 for mounting spindle motor 131b to motor paid 106 of drive 70. Spindle motor 131b may also be pressed into motor aperture 105, which permits elimination of mounting flange 145. Rotor 134b has a cylindrical top protrusion 136 that houses top bearing 140. Top protrusion 136 is insertable into center hollow 130 of hub 17. Rotor 134b is not rigidly attached to fixed shaft 132b. Rather, rotor 134b rotates around fixed shaft 132b. Fixed shaft 132b enables top bearing 140 to be closer to the top of protrusion 136, and therefore closer to the center of mass of disk 16. Top bearing 140 being close to disk 16 center of mass adds stiffness to the motor and raises resonant frequencies. It is understood that the hub 17 and protrusion 136 may also employ additional features to help center the disk 16 to the spindle motor 131a,b. For example, the present invention encompasses additional features including three or more spring fingers in hub 17 that are equally spaced around, and press against, protrusion 136; or a single spring loaded feature to urge hub 17 against protrusion 136 at the same location each engagement.

In operation, as spindle motor 131a,b engages hub 17, protrusion 136 is inserted into hub center hollow 130. Clamp magnets 144 enhance adherence of hub 17 with spindle motor 131a,b. Because center hollow 130 creates space for top bearing 140, a spindle motor 131a,b that is thinner by approximately 2 mm to 3 mm than prior art motors is obtained. Because overall drive height depends in part on spindle motor height, the thinner spindle motor according to the present invention may advantageously result in a thinner disk drive. Also, enlarged center hollow 140 may enable bearings 140 and 142 to be spaced farther apart for a certain spindle motor thickness, which improves drive performance. Additional advantages of the center hollow 130/protrusion 136 combination include higher rocking mode frequencies, better resistance to shock and handling damage, and enhanced engagement between the spindle motor and hub.

The present invention may be embodied in other specific forms without departing from the spirit or essential attributes thereof and, accordingly, reference should be made to the appended claims, rather than to the foregoing specification, as indicating the scope of the invention.

What is claimed is:

1. A cartridge for use in a removable cartridge disk drive, comprising:

a top shell;

a bottom shell pivotally coupled to said top shell for pivoting said cartridge from a closed position to an open position about a shell pivot axis in response to insertion of said cartridge into the drive, said bottom shell and said top shell forming a drive head opening therebetween corresponding to the cartridge being in the open position, said cartridge having at least one rectilinear side; and, a recording medium, disposed between said top shell and said bottom shell, having a medium rotation axis that is non-parallel to said shell pivot axis each one of the top shell and the bottom shell having a dimension greater than a diameter of the recording medium; and a projection coupled to an inside surface of at least one of said top shell and said bottom shell, at least a portion of said projection having an approximately circular shape, said projection enclosing a perimeter of said medium while said cartridge is in the closed position; wherein said projection has a non-circular portion disposed proximate the drive head opening, said non-circular portion forming at least part of the drive head opening while the cartridge is in an open position.

2. The cartridge of claim 1 wherein said top shell comprises a substantially planar top member and said bottom shell comprises a substantially planar bottom member.

3. The cartridge of claim 1 further comprising at least one translating member disposed on at least one of the top shell and the bottom shell, said translating member cooperating with the drive so as to guide said cartridge within the drive.

4. The cartridge of claim 1 wherein each one of said top shell and said bottom shell engage a hub of said recording medium while the shell is in the closed position so as to restrain said recording medium from moving relative to each one of said top shell and said bottom shell.

5. The cartridge of claim 4 wherein said top shell and said bottom shell are spaced apart while said cartridge is in the open position so as to enable said recording medium to rotate.

6. The cartridge of claim 1 further comprising a top holding member and a bottom holding member, said top holding member being coupled to the top shell, said bottom holding member being coupled to the bottom shell, at least one of said top holding member and said bottom holding member being operable for releasably holding said recording medium while said cartridge is in the closed position.

7. the cartridge of claim 6 wherein said top holding member is substantially circular and said bottom holding member is substantially circular.

8. The cartridge of claim 6 wherein said top shell and said bottom shell are spaced apart while said cartridge is in the open position so as to enable said recording medium to rotate.

9. The cartridge of claim 6 wherein each one of said top holding member and said bottom holding member holds at least one of a disk surface and a hub while the cartridge is in the closed position.

10. The cartridge of claim 9 wherein said bottom holding member has a chamfered portion for holding the hub while the cartridge is in the closed position.

11. A cartridge for use in a removable cartridge disk drive, comprising:
   a top shell;
   a bottom shell pivotally coupled to said top shell for pivoting said cartridge from a closed position to an open position about a shell pivot axis in response to insertion of said cartridge into the drive, said bottom shell and said top shell forming a drive head opening therebetween corresponding to the cartridge being in the open position, said cartridge having at least one rectilinear side;
   a recording medium, disposed between said top shell and said bottom shell, having a medium rotation axis that is non-parallel to said shell pivot axis, each one of the top shell and the bottom shell having a dimension greater than a diameter of the recording medium;
   at least one hinge coupled to said top shell and said bottom shell so as to enable at least one of said top shell and said bottom shell to pivot about said shell pivot axis, said shell pivot axis oriented substantially perpendicular to the medium rotation axis; and
   a seal coupled to at least one of said top shell and said bottom shell, said seal being positioned between said recording medium and each one of said at least one hinge for inhibiting particulate infiltration between said at least one hinge and said recording medium; wherein said seal has a non-circular portion disposed proximate the drive head opening, said non-circular portion forming at least part of the drive head opening while the cartridge is in an open position.

12. The cartridge of claim 11 wherein said at least one hinge is disposed proximate a back end of said cartridge; said top shell and said bottom shell forming the drive head opening therebetween at a front end of said cartridge while said cartridge is in the open position.

13. The cartridge of claim 11 wherein the bottom shell has a cantilever portion so as to enable the top shell and the bottom shell to be snapped theretogether during assembly, said at least one hinge being at least partially disposed on said cantilever portion.

14. The cartridge of claim 11 wherein said seal comprises at least one of a labyrinth seal and a compliant seal.

15. A cartridge for use in a removable cartridge disk drive, comprising:
   a top shell;
   a bottom shell pivotally coupled to said top shell for pivoting said cartridge from a closed position to an open position about a shell pivot axis in response to insertion of said cartridge into the drive, said bottom shell and said top shell forming a drive head opening therebetween corresponding to the cartridge being in the open position, said cartridge having at least one rectilinear side;
   a recording medium, disposed between said top shell and said bottom shell, having a medium rotation axis that is non-parallel to said shell pivot axis, each one of the top shell and the bottom shell having a dimension greater than a diameter of the recording medium;
   two latch mechanisms coupled to at least one of said top shell and said bottom shell for releasably locking said top shell to said bottom shell while the cartridge is in the closed position, the two latch mechanisms disposed at adjacent corners of said cartridge; said latch mechanisms being releasable in response to insertion of said cartridge into the drive so as to enable said cartridge to open while said cartridge is positioned within the drive; and
   a seal coupled to at least one of said top shell and said bottom shell, said seal being positioned between said recording medium and each one of said two latch mechanisms for inhibiting particulate infiltration between said latch mechanisms and said recording medium; wherein said seal has a non-circular portion disposed proximate the drive head opening, said non-circular portion forming at least part of the drive head opening while the cartridge is in an open position.

16. The cartridge of claim 15 further comprising a first slot exposing a first one of the two latch mechanisms and a second slot exposing a second one of the two latch mechanisms, each one of the slots for translationally receiving a drive disengaging member.

17. The cartridge of claim 15 wherein said seal comprises at least one of a labyrinth seal and a compliant seal.

18. The cartridge of claim 3 wherein said at least one translating member forms at least one notch therein for cooperating with a cartridge guide of the drive.

19. A cartridge for use in a removable cartridge disk drive, comprising:
   a top shell;
   a bottom shell pivotally coupled to said top shell for pivoting said cartridge from a closed position to an open position about a shell pivot axis in response to insertion of said cartridge into the drive, said bottom shell and said top shell forming a drive head opening therebetween corresponding to the cartridge being in the open position, said cartridge having at least one rectilinear side;
   a recording medium, disposed between said top shell and said bottom shell, having a medium rotation axis that is non-parallel to said shell pivot axis, each one of the top shell and the bottom shell having a dimension greater than a diameter of the recording medium; and,
   at least one ramp coupled to at least one of the top shell and the bottom shell, said at least one ramp being operable for cooperating with a wedge disposed in the drive for opening the cartridge.

20. The cartridge of claim 19 wherein said top shell has a top ramp, and said bottom shell has a bottom ramp, said bottom ramp opposing said top ramp so as to cooperate with a wedge disposed in the drive for opening the cartridge.

21. The cartridge of claim 20 wherein said top ramp has a substantially horizontal portion, and said bottom ramp has a substantially horizontal portion, said top ramp horizontal portion and said bottom ramp horizontal portion cooperating with an opposing horizontal portion disposed on the wedge.

22. A disk drive for receiving a removable cartridge, said cartridge having a recording medium disposed therein, comprising:
   a structure;
   a motor coupled to said structure for rotating the recording medium; and
   an opening mechanism coupled to said structure, said mechanism being operable for pivoting apart a top shell and a bottom shell of said cartridge about a pivot axis that substantially perpendicular to an axis of rotation of the recording medium so as to form a recording opening therebetween;
   a closing mechanism disposed within said structure for pivoting the cartridge from an open position to a closed position, said closing mechanism comprising at least one proximal incline and at least one distal incline, said closing mechanism limiting the pivoting apart of the top shelf relative to the bottom shell said proximal incline and said distal incline rigidly coupled to said structure.

23. The drive of claim 22 further comprising at least one disengaging member coupled to the structure, said disengaging member being operable to unlock a latch of the cartridge.

24. The drive of claim 22 further comprising sealing means for inhibiting particulates from mechanically communicating with the recording medium while the cartridge is in the open position.

25. The drive of claim 22 wherein said opening mechanism comprises wedges coupled to said structure, said wedges being operable for pivoting apart a top shell and a bottom shell of said cartridge.

26. The drive of claim 25 wherein said wedges have a substantially horizontal portion for cooperating with an opposing horizontal portion disposed on at least one cartridge ramp.

27. The drive of claim 25 further comprising at least one shield having a substantially planar surface coupled to said at least one wedge, said shield being located proximate an open side of the cartridge recording opening for inhibiting particulate infiltration therethrough.

28. The drive of claim 22 further comprising at least one shield having at least one substantially planar surface coupled to said structure, said shield being positioned so as to inhibit particulate infiltration into the cartridge.

29. The drive of claim 22 further comprising at least one cartridge guide disposed on said structure for guiding the cartridge while the cartridge is within said drive.

30. The drive of claim 29 wherein said at least one cartridge guide comprises at least one proximal cartridge guide and at least one distal cartridge guide being coupled to said structure, said proximal cartridge guide and said distal cartridge guide being operable for cooperating with at least one translating member disposed on the cartridge.

31. The drive of claim 29 wherein said at least one cartridge guide forms a top surface having a slope that substantially mates to the cartridge while the cartridge is in an open position.

32. The drive of claim 22 wherein said at least one proximal incline is disposed on a distal side of the at least one proximal cartridge guide and said at least one distal incline is disposed on a distal side of the at least one distal cartridge guide.

33. The drive of claim 22 wherein said closing mechanism comprises a cartridge slot formed in the drive structure for receiving the cartridge, said cartridge slot being operable to urge the cartridge from an open position to a closed position as the cartridge exits the drive.

34. The drive of claim 22 further comprising a read/write head assembly disposed within the structure for at least one of reading and recording data on a medium disposed within said cartridge.

* * * * *